(12) United States Patent
Kato et al.

(10) Patent No.: US 9,663,408 B2
(45) Date of Patent: May 30, 2017

(54) HONEYCOMB STRUCTURE

(71) Applicant: NGK Insulators, Ltd., Nagoya (JP)

(72) Inventors: Yasushi Kato, Nagoya (JP); Takahiro Kondo, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 299 days.

(21) Appl. No.: 14/492,772

(22) Filed: Sep. 22, 2014

(65) Prior Publication Data
US 2015/0086748 A1    Mar. 26, 2015

(30) Foreign Application Priority Data

Sep. 26, 2013  (JP) .................................. 2013-200251

(51) Int. Cl.
| | |
|---|---|
| *B01D 46/24* | (2006.01) |
| *F01N 3/022* | (2006.01) |
| *C04B 38/00* | (2006.01) |
| *F01N 3/28* | (2006.01) |

(52) U.S. Cl.
CPC ...... *C04B 38/0009* (2013.01); *B01D 46/2451* (2013.01); *F01N 3/0222* (2013.01); *F01N 3/2828* (2013.01); *F01N 2260/10* (2013.01); *F01N 2330/06* (2013.01); *F01N 2330/30* (2013.01); *F01N 2330/34* (2013.01); *F01N 2330/60* (2013.01); *Y02T 10/20* (2013.01); *Y10T 428/24149* (2015.01)

(58) Field of Classification Search
None
See application file for complete search history.

(56) References Cited

U.S. PATENT DOCUMENTS

| | | | |
|---|---|---|---|
| 2002/0192426 | A1 | 12/2002 | Ichikawa et al. |
| 2010/0244309 | A1* | 9/2010 | Hayashi ................. B29C 47/12 |
| | | | 264/177.12 |

FOREIGN PATENT DOCUMENTS

| | | |
|---|---|---|
| EP | 1384 507 A2 | 1/2004 |
| EP | 2 130 606 A2 | 12/2009 |
| EP | 2 236 205 A2 | 10/2010 |
| JP | 11-270334 A1 | 10/1999 |
| JP | 11-277653 A1 | 10/1999 |
| JP | 2000-238153 A1 | 9/2000 |
| WO | 02/11884 A1 | 2/2002 |

OTHER PUBLICATIONS

Extended European Search Report (Application No. 14186312.6) dated Feb. 10, 2015.

* cited by examiner

*Primary Examiner* — David Sample
*Assistant Examiner* — Nicholas W Jordan
(74) *Attorney, Agent, or Firm* — Burr & Brown, PLLC

(57) ABSTRACT

In a cross section of a honeycomb structure body, shape of the cells is polygonal, and the honeycomb structure body is constituted so that thickness of partition walls in circumferential region is larger than in central region. In the cross section, when among the cells arranged on a first line segment passing the center of gravity and extending in a direction perpendicular to the partition walls each constituting one side of the cells, cell pitch of the respective five or less cells each arranged on the first line segment toward each of the central region side and the circumferential region side from boundary between the central region and the circumferential region has a size of 70% or more and 95% or less to cell pitch in the extending direction of the first line segment of the cells in the central region of the honeycomb structure.

16 Claims, 20 Drawing Sheets

HONEYCOMB STRUCTURE

The present application is an application based on JP-2013-200251 filed on Sep. 26, 2013 with the Japan Patent Office, the entire contents of which are incorporated herein by reference.

BACKGROUND OF THE INVENTION

Field of the Invention

The present invention relates to a honeycomb structure. More particularly, it relates to a honeycomb structure which is excellent in pressure resisting strength of circumferential portion and in thermal shock resistance.

Description of Related Art

Ceramic honeycomb structures excellent in thermal resistance and corrosion resistance have been employed as carriers for catalyst devices or filters for use as environmental measures, collection of specific material or the like in various fields of chemistry, electric power, steel industry, and the like. In the honeycomb structures, a structure resembling a honeycomb built by bees (honeycomb structure) is formed by partition walls to define cells that become through channels for a fluid. Such honeycomb structures are used as catalyst carriers onto which catalyst for purification of exhaust gas is loaded in exhaust gas purification devices to purify the exhaust gas discharged from internal combustion engines such as car engines. Furthermore, in the honeycomb structures, open ends of the cells in both end faces are alternately plugged to obtain plugged honeycomb structures, and the honeycomb structures are also often used as diesel particulate filters to trap particulate matter discharged from diesel engines or the like.

When the exhaust gas is purified by a honeycomb structure, the honeycomb structure is sometimes used, for example, in an exhaust gas purification device in which the honeycomb structure is contained in a can member having an inflow port through which the exhaust gas flows inside and an outflow port through which the purified exhaust gas flows outside. Hereinafter, the containing of the honeycomb structure into a can member of the exhaust gas purification device as described above may be referred to as "canning".

Heretofore, when such a honeycomb structure is contained in the can member of the exhaust gas purification device, damages are sometimes generated in a circumferential portion of the honeycomb structure. Therefore, there have been suggested various technologies to improve the pressure resisting strength of the circumferential portion of the honeycomb structure (e.g., see Patent Documents 1 to 4).

In Patent Document 1, for a honeycomb structure in which cross sections of cells are hexagonal, there has been described a technology in which a thickness of partition walls of a circumferential portion is set to be larger than a thickness of partition walls of a central portion. Furthermore, in Patent Document 2 and Patent Document 3, for a honeycomb structure in which cross sections of cells are quadrangular, there has been described a technology in which a thickness of partition walls of a circumferential portion is set to be larger than a thickness of partition walls of a central portion. Furthermore, in Patent Document 4, there has been described a technology in which a hydraulic diameter of cells positioned at the edge of at least one of four sides constituting a rectangular or square cross section of a honeycomb structure is made to be smaller than a hydraulic diameter of other cells.

[Patent Document 1] JP-A-H11-270334
[Patent Document 2] JP-A-H11-277653
[Patent Document 3] WO 02/011884
[Patent Document 4] JP-A-2000-238153

SUMMARY OF THE INVENTION

In the honeycomb structures described in Patent Documents 1 to 3, thickness of partition walls in a circumferential portion is large, and hence pressure resisting strength of the circumferential portion is improved. However, thermal shock resistance deteriorates in a boundary portion between a portion in which the thickness of the partition walls is increased (i.e., the circumferential portion) and a central portion in which the thickness of the partition walls is not increased, which has caused the problem that cracks are easily generated in the boundary portion.

For example, when the honeycomb structure is used as a catalyst carrier (hereinafter may simply be referred to as "carrier") in an exhaust gas purification device, temperature difference occurs in the carrier when the temperature of the exhaust gas rises and drops. That is, when the temperature of the exhaust gas rises (e.g., during acceleration of a vehicle), temperature of a portion to which the exhaust gas is applied in the central portion of the carrier heightens, and temperature in the vicinity of the circumference lowers. Conversely, when the temperature of the exhaust gas lowers (e.g., during deceleration of the vehicle), the temperature of the portion to which the exhaust gas is applied in the central portion of the carrier lowers, and the temperature in the vicinity of the circumference heightens. Thus, when the temperature difference occurs in the carrier on respective conditions during running of the vehicle or the like, heat stress is generated by expansion and contraction in the carrier. When the thickness of the partition walls of the circumferential portion is larger as compared with the thickness of the partition walls of the central portion, strength of the circumferential portion against the heat stress is larger. However, a portion in which the thickness of the partition walls decreases from that of the circumferential portion, i.e., the boundary portion between the circumferential portion and the central portion is noticeably and disadvantageously influenced by the heat stress. Therefore, in the honeycomb structures described in Patent Documents 1 to 3, the thermal shock resistance of the boundary portion between the circumferential portion and the central portion deteriorates, and cracks are easily generated in the boundary portion when the temperature of the exhaust gas rises or drops.

Furthermore, also in the honeycomb structure described in Patent Document 4, the thermal shock resistance deteriorates in a boundary portion between a portion where cells having a larger hydraulic diameter are formed and a portion where cells having a smaller hydraulic diameter are formed. Therefore, also in the honeycomb structure described in Patent Document 4, there has been the problem that cracks are easily generated in the boundary portion in the same manner as in the honeycomb structures described in Patent Documents 1 to 3.

The present invention has been developed in view of such problem, and an object thereof is to provide a honeycomb structure which is excellent in pressure resisting strength of the circumferential portion and in thermal shock resistance.

According to the present invention, there is provided a honeycomb structure described in the following.

According to a first aspect of the present invention, a honeycomb structure including a tubular honeycomb structure body having porous partition walls to define a plurality of cells extending from a first end face to a second end face is provided, wherein in a cross section perpendicular to an extending direction of the cells of the honeycomb structure body, the partition walls are disposed so that a shape of the cells is polygonal, and the honeycomb structure body is constituted so that a thickness of the partition walls in a circumferential region positioned at an outer side of a central region is larger than a thickness of the partition walls in the central region including center of gravity of the cross section, and in the cross section of the honeycomb structure body, when one line segment passing the center of gravity of the cross section and extending in a direction perpendicular to the partition walls each constituting one side of each of the polygonal cells is to be a first line segment, for respective five or less cells each arranged on the first line segment toward each of the central region and the circumferential region from a boundary between the central region and the circumferential region among the cells arranged on the first line segment, a cell pitch in the extending direction of the first line segment has a size of 70% or more and 95% or less to a cell pitch in the extending direction of the first line segment of the cells arranged on the first line segment in the central region excluding the respective five or less cells.

According to a second aspect of the present invention, the honeycomb structure according to the above first aspect is provided, wherein in the cross section of the honeycomb structure body, when another line segment passing the center of gravity of the cross section and extending in a direction perpendicular to the partition walls constituting sides other than the one side of each of the polygonal cells is to be a second line segment, for respective five or less cells each arranged on the second line segment toward each of the central region and the circumferential region from the boundary between the central region and the circumferential region among the cells arranged on the second line segment, a cell pitch in the extending direction of the second line segment has a size of 70% or more and 95% or less to a cell pitch in the extending direction of the second line segment of the cells arranged on the second line segment in the central region excluding the respective five or less cells.

According to a third aspect of the present invention, the honeycomb structure according to the above first or second aspects is provided, wherein in the cells arranged on the first line segment, a shape of the respective five or less cells each arranged on the first line segment toward each of the central region and the circumferential region from the boundary between the central region and the circumferential region is a shape obtained by contracting a shape of the cells formed in the central region excluding the respective five or less cells, in at least the extending direction of the first line segment.

According to a fourth aspect of the present invention, the honeycomb structure according to any one of the above first to third aspects are provided, wherein in the cells arranged on the first line segment, a thickness of the partition walls in the circumferential region excluding the respective five or less cells arranged in the extending direction of the first line segment is from 1.05 to 1.8 times a thickness of the partition walls in the central region excluding the respective five or less cells arranged in the extending direction of the first line segment.

According to a fifth aspect of the present invention, the honeycomb structure according to any one of the above first to fourth aspects are provided, wherein in the cells arranged on the first line segment, a cell pitch of the cells formed in the central region excluding the respective five or less cells arranged in the extending direction of the first line segment has the same cell pitch as that of the cells formed in the circumferential region excluding the respective five or less cells arranged in the extending direction of the first line segment.

A honeycomb structure of the present invention is excellent in pressure resisting strength of circumferential portion and in thermal shock resistance. That is, the honeycomb structure of the present invention is constituted so that a thickness of partition walls in a circumferential region positioned at an outer side of a central region is larger than a thickness of partition walls in the central region. Therefore, the honeycomb structure is excellent in pressure resisting strength of the circumferential portion. Furthermore, cells of a cell pitch having a size of 70% or more and 95% or less to a cell pitch of the cells formed in the central region are formed in a boundary portion between the central region and the circumferential portion. That is, in the above boundary portion, "small cell-pitch cells" whose cell pitch is relatively small are formed. Such "small cell-pitch cells" are formed, so that the thermal shock resistance of the boundary portion improves. Therefore, in the honeycomb structure of the present invention, for example, even when large heat stress is applied to the boundary portion, damages such as cracks are not easily generated in the boundary portion.

DETAILED DESCRIPTION OF THE INVENTION

Hereinafter, embodiments of the present invention will be described with reference to the drawings. The present invention is not limited to the following embodiments, and change, modification or improvement can be added without departing from the gist of the present invention.

Figure 1:
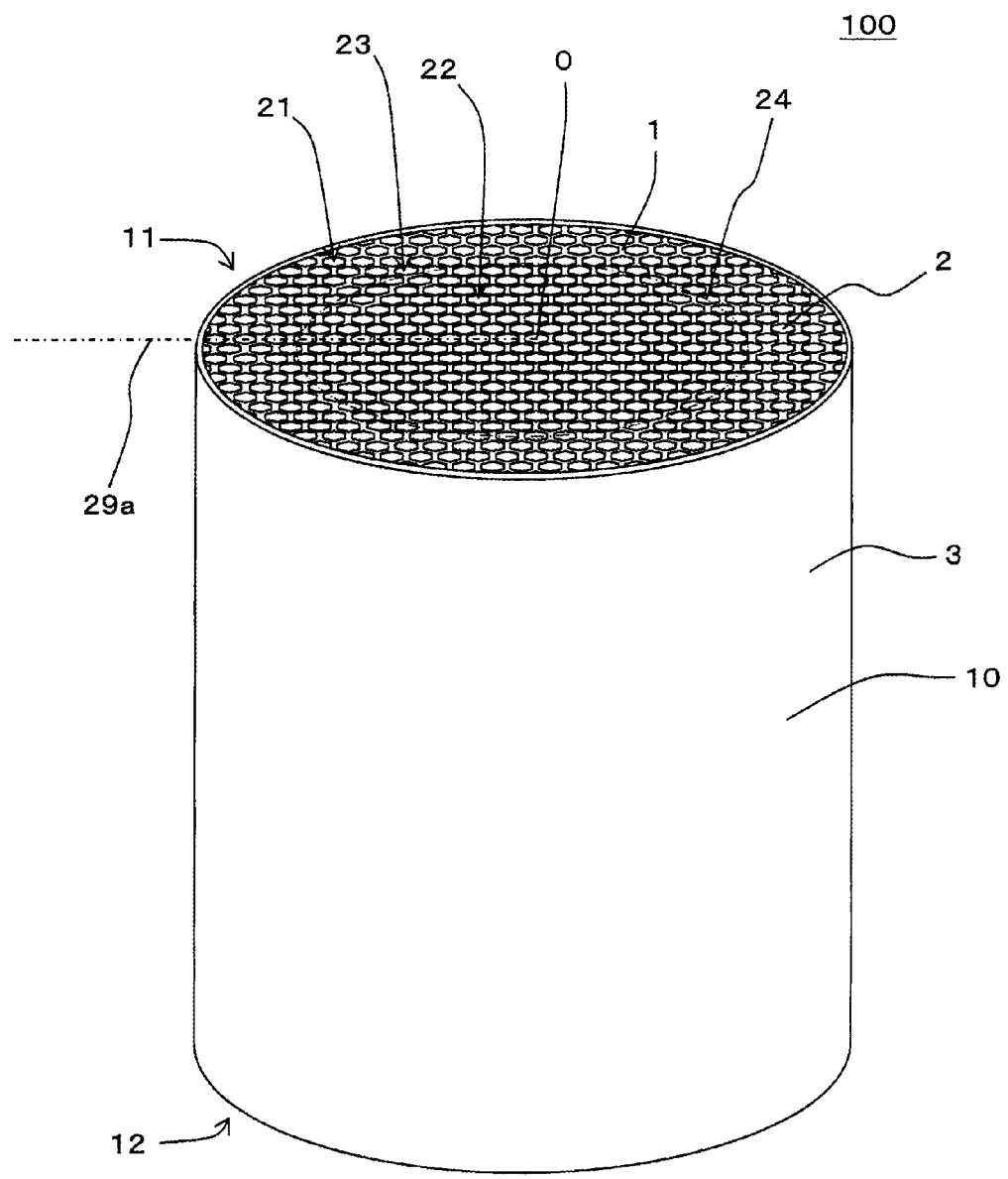
FIG. 1 is a perspective view schematically showing one embodiment of a honeycomb structure of the present invention.
Figure 2:
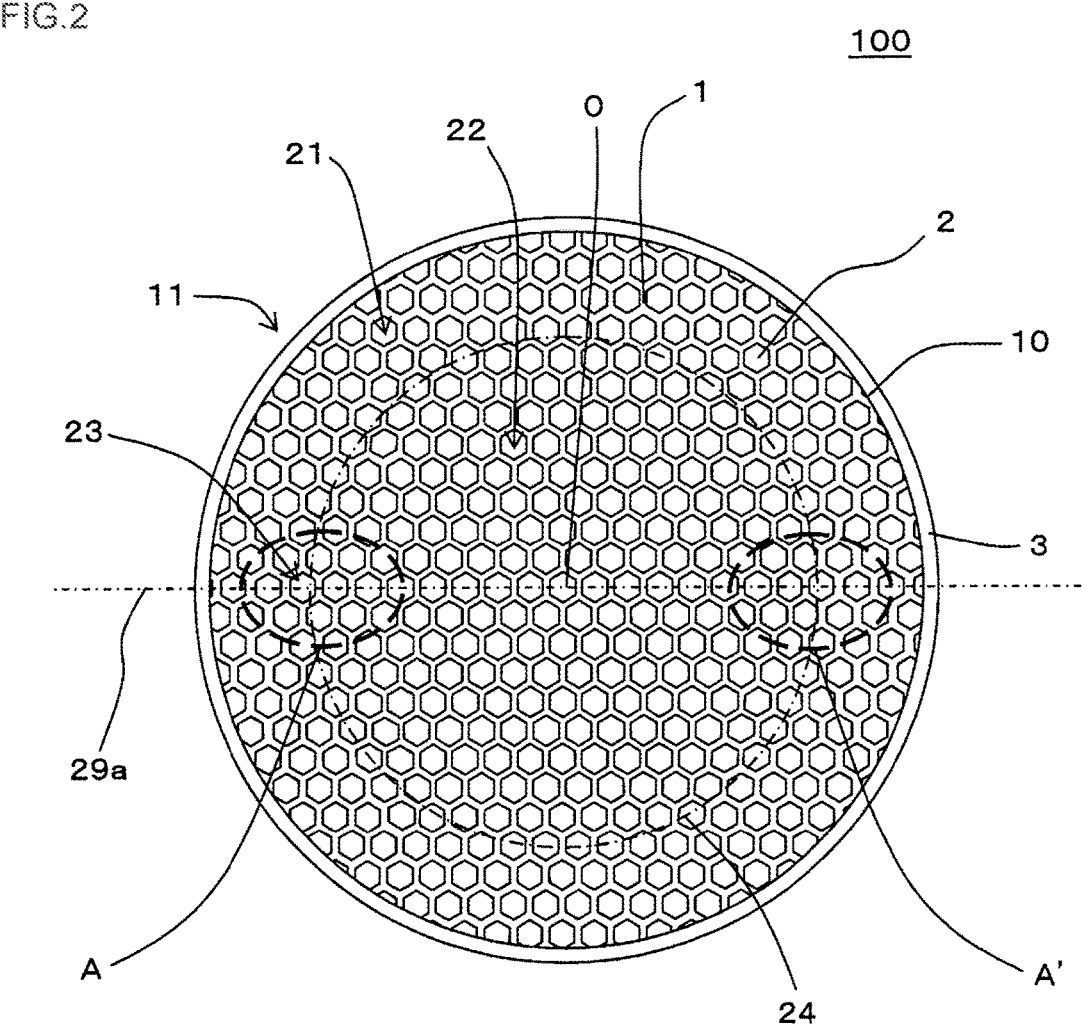
FIG. 2 is a plan view schematically showing a first end face of the one embodiment of the honeycomb structure of the present invention.
Figure 3:
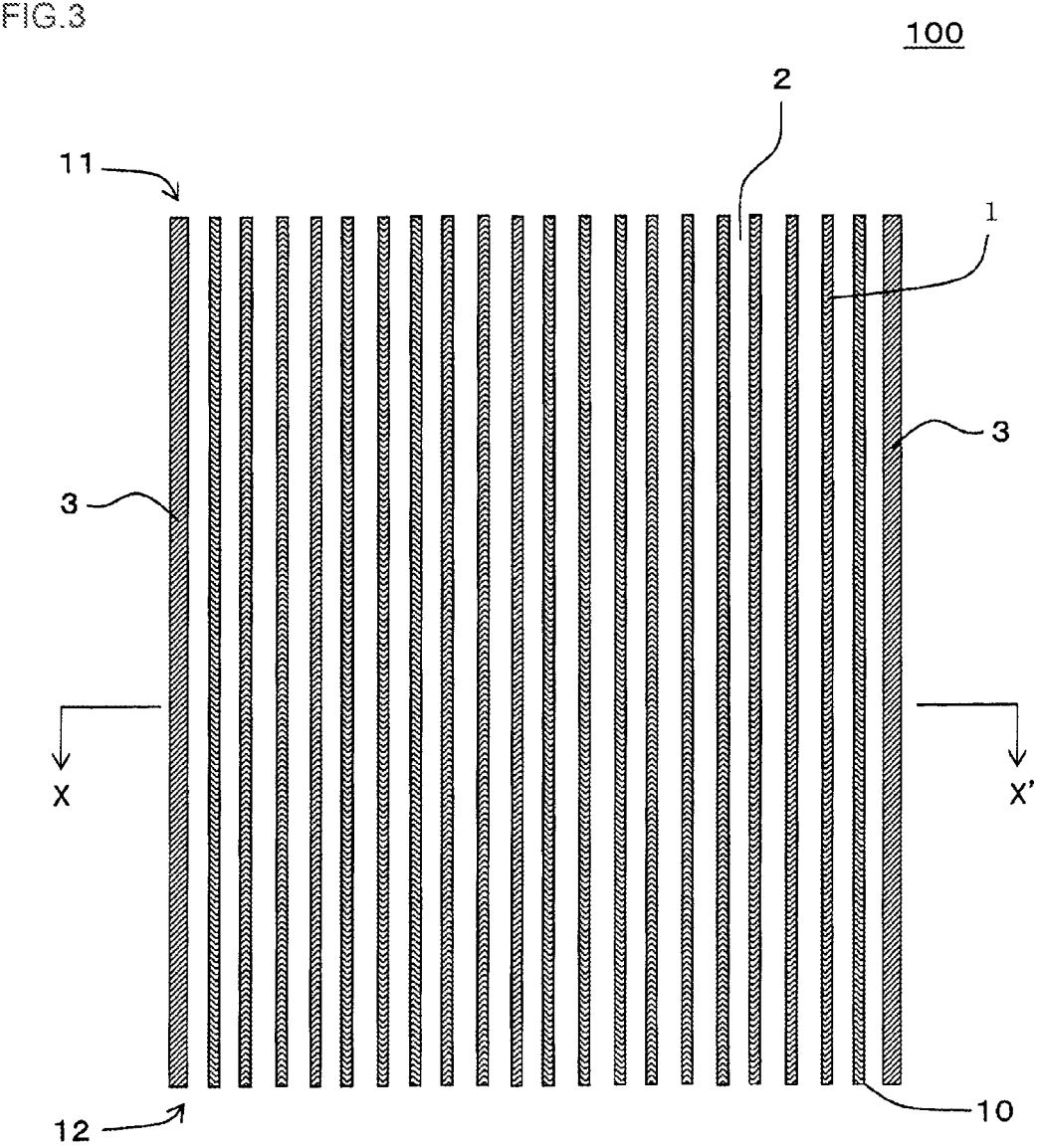
FIG. 3 is a sectional view schematically showing a cross section parallel to a cell extending direction of the one embodiment of the honeycomb structure of the present invention.
Figure 4:
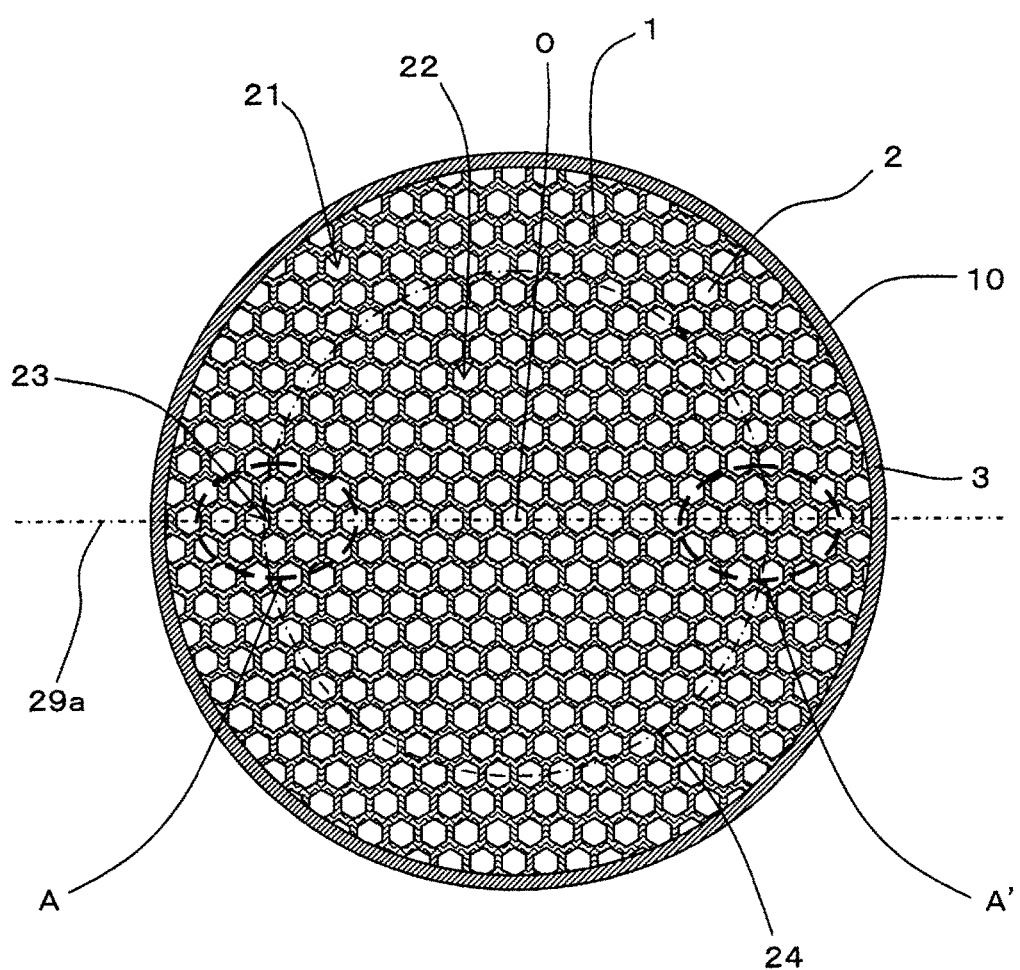
FIG. 4 is a sectional view schematically showing a cross section cut along the X-X' line of FIG. 3.
Figure 5:
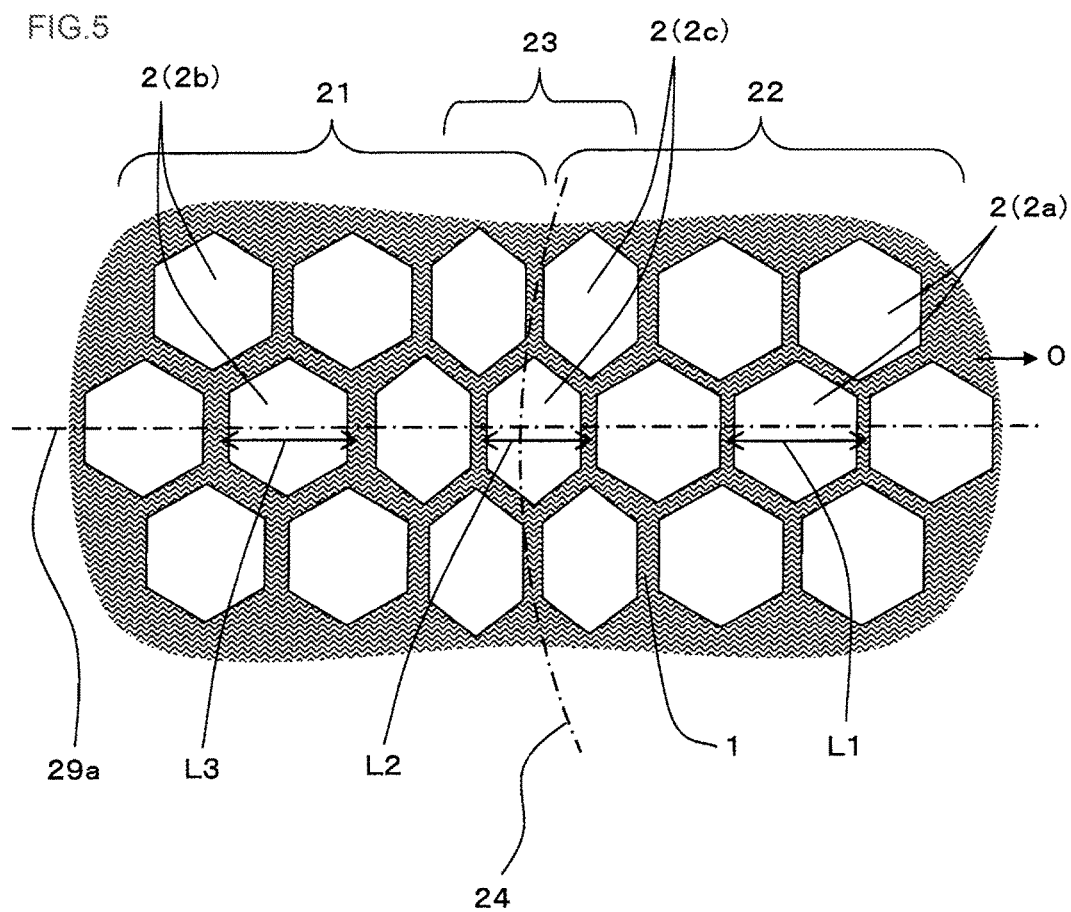
FIG. 5 is an enlarged sectional view schematically showing a range shown in A of FIG. 4.
Figure 6:
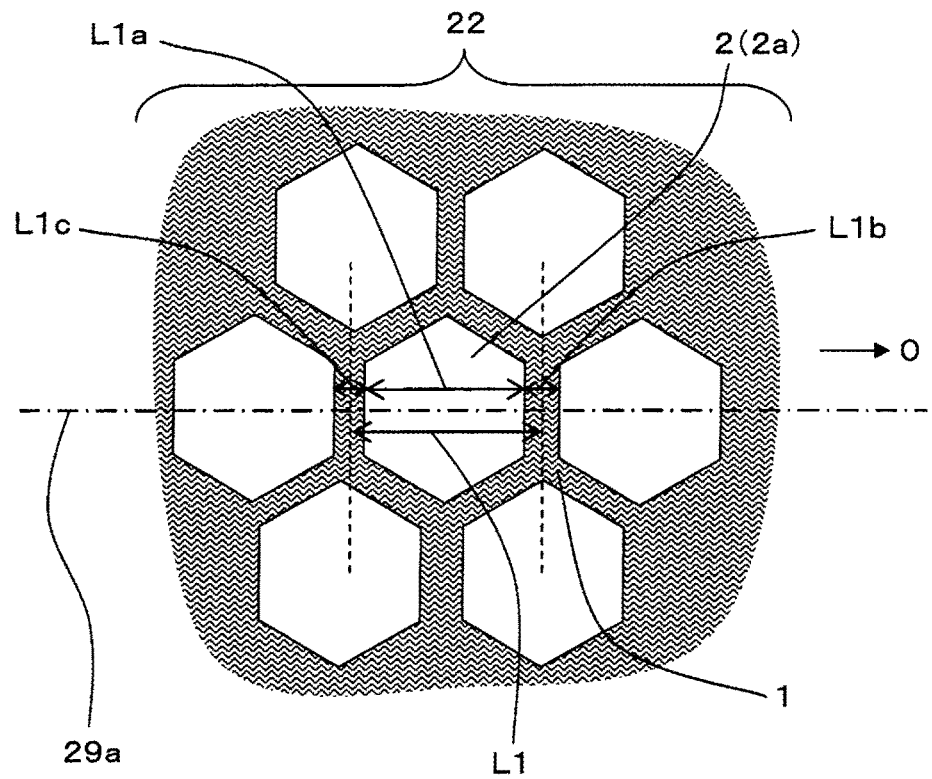
FIG. 6 is a partially enlarged sectional view in which a part of the cross section shown in FIG. 5 is enlarged.
Figure 7:
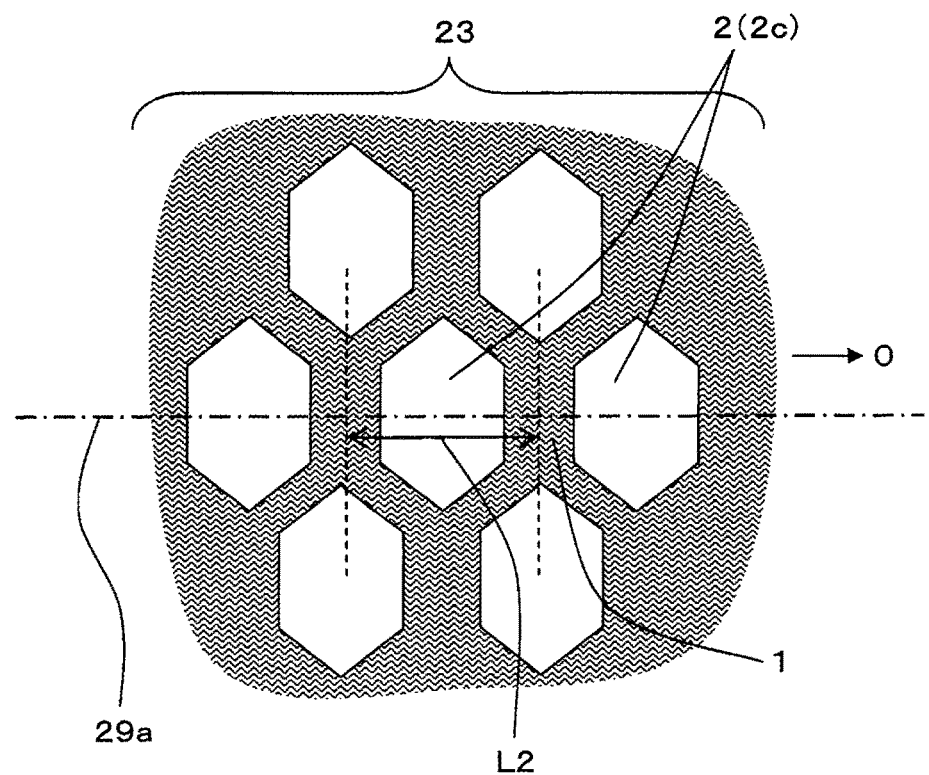
FIG. 7 is a partially enlarged sectional view in which another part of the cross section shown in FIG. 5 is enlarged.
Figure 8:
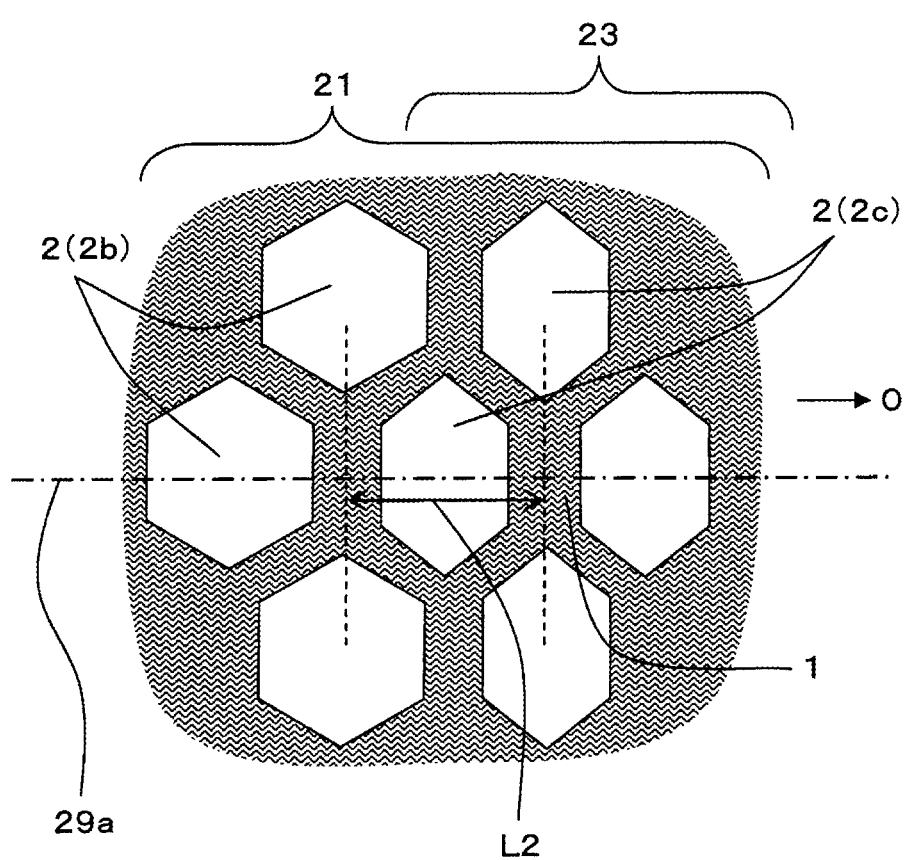
FIG. 8 is a partially enlarged sectional view in which still another part of the cross section shown in FIG. 5 is enlarged.

(1) Honeycomb Structure:

One embodiment of a honeycomb structure of the present invention will be described. FIG. 1 is a perspective view schematically showing one embodiment of the honeycomb structure of the present invention. FIG. 2 is a plan view schematically showing a first end face of the one embodiment of the honeycomb structure of the present invention. FIG. 3 is a sectional view schematically showing a cross section parallel to a cell extending direction of the one embodiment of the honeycomb structure of the present invention. FIG. 4 is a sectional view schematically showing a cross section cut along the X-X' line of FIG. 3. FIG. 5 is an enlarged sectional view schematically showing a range shown in A of FIG. 4. FIG. 6 is a partially enlarged sectional view in which a part of the cross section shown in FIG. 5 is enlarged. FIG. 7 is a partially enlarged sectional view in which another part of the cross section shown in FIG. 5 is enlarged. FIG. 8 is a partially enlarged sectional view in which still another part of the cross section shown in FIG. 5 is enlarged.

As shown in FIG. 1 to FIG. 4, a honeycomb structure 100 of the present embodiment includes a tubular honeycomb structure body 10 having porous partition walls 1 to define a plurality of cells 2 extending from a first end face 11 to a second end face 12. The honeycomb structure body 10 shown in FIG. 1 to FIG. 4 is cylindrical. In the honeycomb structure 100 of the present embodiment, the honeycomb structure body 10 may have a circumferential wall 3 disposed in the outermost circumference so as to surround the partition walls 1. The honeycomb structure 100 has the circumferential wall 3, so that the honeycomb structure is easily contained in a can member of an exhaust gas purification device.

In a cross section of the honeycomb structure body 10 which is perpendicular to an extending direction of the cells 2, the partition walls 1 are disposed so that a shape of the cells 2 is polygonal. Examples of the shape of the cells in the cross section perpendicular to the cell extending direction include a quadrangular shape, a hexagonal shape, an octagonal shape, and any combination of these shapes. Hereinafter, "shape of the cells in the cross section perpendicular to the cell extending direction" may be referred to as "sectional shape of the cells". Furthermore, the sectional shape of the cells may be a shape in which at least one side of the polygonal shape is curved inwardly or outwardly. FIG. 1 to FIG. 8 show an example where the sectional shape of the cells 2 is hexagonal. Hereinafter, in the present invention, "cross section" means "cross section of the honeycomb structure body 10 which is perpendicular to the extending direction of the cells 2", unless otherwise specified.

The honeycomb structure body 10 is constituted so that a thickness of the partition walls 1 in a circumferential region 21 positioned on an outer side of a central region 22 is larger than a thickness of the partition walls 1 in the central region 22 including center of gravity O of the cross section perpendicular to the extending direction of the cells 2. That is, the honeycomb structure body 10 is constituted so that the thickness of the partition walls 1 is relatively small in the central region 22, and the thickness of the partition walls 1 is relatively large in the circumferential region 21. According to such a constitution, a pressure resisting strength of the circumferential region 21 (in other words, a circumferential portion of the honeycomb structure 100) can be improved.

There is not any special restriction on a size of a range in which the central region 22 and the circumferential region 21 are formed. For example, the central region 22 is preferably a range of 50 to 98% of a length of a radius of the cross section from the center of gravity O of the above cross section. The central region 22 is further preferably a range of 60 to 95% of the length of the radius of the cross section from the center of gravity O of the cross section, and especially preferably a range of 70 to 90% of the length of the radius of the cross section. According to such a constitution, it is possible to obtain an effect of improving the pressure resisting strength of the honeycomb structure during canning. Here, in the present specification, "canning" means that the honeycomb structure is contained in a can member of the gas purification device or the like.

Furthermore, the honeycomb structure 100 of the present embodiment employs a constitution described in the following, and is therefore excellent also in thermal shock resistance. First, in the cross section of the honeycomb structure body 10 shown in FIG. 4, one line segment passing the center of gravity O of the cross section and extending in a direction perpendicular to the partition wall 1 constituting one side of each of the polygonal cells 2 is to be a first line segment 29a. The first line segment 29a is a virtual line segment drawn in the cross section of the honeycomb structure body 10. As shown in FIG. 5, plurality of cells 2 are arranged on the first line segment 29a in an extending direction of the first line segment 29a. Here, among the cells 2 arranged on the first line segment 29a, the cells 2 present in the central region 22 are central region cells 2a. Furthermore, among the cells 2 arranged on the first line segment 29a, the cells 2 present in the circumferential region 21 are circumferential region cells 2b. Each central region cells 2a has an equivalent cell pitch in the central region 22 and each circumferential region cells 2b has an equivalent cell pitch in the circumferential region 21. Thicknesses of the partition walls 1 to define the cells 2 in the central region 22 and the circumferential region 21 are different from each other and are demarcated by a boundary 24. That is, the thickness of the partition walls 1 to define the central region cells 2a is relatively small, and the thickness of the partition walls 1 to define the circumferential region cells 2b is relatively large. In the honeycomb structure of the present embodiment, among the cells 2 arranged on the first line segment 29a, respective five or less cells 2 (2c) are each arranged on the first line segment 29a toward each of the central region 22 and the circumferential region 21 from the boundary 24. The respective five or less cells 2 (2c) are characterized in that cell pitch of the cells 2c is decreased. Hereinafter, among the cells 2 arranged on the first line segment 29a, the respective five or less cells 2c each arranged on the first line segment 29a toward each of the central region 22 and the circumferential region 21 from the boundary 24 and having the decreased cell pitch of the cells 2c may be referred to as "small cell-pitch cells 2c". For the small cell-pitch cells 2c, a cell pitch L2 in the extending direction of the first line segment 29a has a size of 70% or more and 950 or less to a cell pitch L1 of the central region cells 2a. "Cell pitch L1 of each of the central region cells 2a" is the cell pitch L1 in the extending direction of the first line segment 29a of the cells 2a (the central region cells 2a) arranged on the first line segment 29a in the central region 22 excluding the small cell-pitch cells 2c. Furthermore, "cell pitch L1 of the central region cell 2a" in a case where the abovementioned ratio of the cell pitch is obtained is an average value of the cell pitches of the cells 2a arranged on the first line segment 29a among the cells 2a of the central region 22.

As described above, the cell pitch L2 of the respective five or less cells 2c each arranged on the first line segment 29a toward each of the central region 22 and the circumferential region 21 from the boundary 24 is decreased to improve the thermal shock resistance of a boundary portion 23 between the central region 22 and the circumferential region 21. Therefore, for example, when the honeycomb structure 100 of the present embodiment is used as a catalyst carrier for the exhaust gas purification device, generation of cracks in the boundary portion can effectively be inhibited against a temperature rise or drop of an exhaust gas. Furthermore, the cell pitch L2 of the cells in the boundary portion 23 (the small cell-pitch cells 2c) is decreased, whereby a size of an open end of each of the small cell-pitch cells 2c becomes smaller. Therefore, as compared with the other cells 2, an amount of a catalyst to be loaded onto the small cell-pitch cells 2c becomes smaller, and there is an expectation for a further improvement of the thermal shock resistance in the boundary portion 23. It is to be noted that the boundary portion 23 is a range in which there are formed the respective five or less cells 2c each arranged on the first line segment 29a toward each of the central region 22 and the circumferential region 21 from the boundary 24. The boundary portion 23 may be included in the central region 22 or may be included in the circumferential region 21. Furthermore, the boundary portion 23 may be included in both of the central region 22 and the circumferential region 21. Ranges shown with A and A' in FIG. 2 and FIG. 4 include the boundary portions 23, respectively.

The cell pitch L2 in the extending direction of the first line segment 29a of the small cell-pitch cells 2c has a size of preferably 70 to 93% and further preferably 70 to 90% to the cell pitch L1 in the extending direction of the first line segment 29a of the central region cells 2a. The cell pitch L2 in the extending direction of the first line segment 29a of the small cell-pitch cells 2c is further decreased, so that the thermal shock resistance can further be improved.

Furthermore, for the small cell-pitch cells 2c, the cell pitch L2 in the extending direction of the first line segment 29a preferably has a size of 70% or more and 95% or less to a cell pitch L3 of the circumferential region cells 2b. It is to be noted that "cell pitch L3 of the circumferential region cells 2b" is the cell pitch L3 in the extending direction of the first line segment 29a of the cells 2b (the circumferential region cells 2b) arranged on the first line segment 29a in the circumferential region 21 excluding the small cell-pitch cells 2c. According to such a constitution, the cell pitch L2 of the small cell-pitch cells 2c has a size of 70% or more and 95% or less to the cell pitches L1, L3 of the other cells 2a, 2b arranged on the first line segment 29a, so that the thermal shock resistance in the boundary portion 23 remarkably suitably improves.

The cell pitch L2 in the extending direction of the first line segment 29a of the small cell-pitch cells 2c has a size of further preferably 70 to 93% and especially preferably 70 to 90% to the cell pitch L3 in the extending direction of the first line segment 29a of the circumferential region cells 2b. The cell pitch L2 in the extending direction of the first line segment 29a of the small cell-pitch cells 2c is further decreased, so that the thermal shock resistance can further be improved.

Here, "cell pitch" in the present invention will be described. The "cell pitch" in the present invention is a length obtained by adding a width at an open end of a cell (hereinafter referred to as "one cell") as a measurement object of the cell pitch and half thicknesses of each of the two partition walls which define the cell on both sides thereof. That is, a "cell pitch L" of the one cell can be obtained as follows. First, the width of the open end of the one cell in one direction is "La". Furthermore, thicknesses of the two partition walls to define the one cell in the one direction are "Lb" and "Lc". The "cell pitch L" is a length $(La + \frac{1}{2}Lb + \frac{1}{2}Lc)$ which is obtained by adding the width La of the above open end, the length of half the thickness Lb of the partition wall, and the length of half the thickness Lc of the other partition wall.

For example, FIG. 6 is a partially enlarged sectional view in which a part of the central region 22 of the cross section shown in FIG. 5 is enlarged. In FIG. 6, reference number L1a indicates a width at an open end in the extending direction of the first line segment 29a of the central region cell 2a. Symbols L1b and L1c indicate thicknesses of the partition walls 1 disposed perpendicularly to the extending direction of the first line segment 29a, respectively, among the partition walls 1 to define the central region cells 2a. It is to be noted that the thickness L1b is a thickness of the partition wall 1 disposed closer to the center of gravity O of the cross section among the partition walls 1 which define the central region cells 2a. The thickness L1c is a thickness of the partition wall 1 disposed farther from the center of gravity O of the cross section among the partition walls 1 which define the central region cells 2a. The cell pitch L1 in the extending direction of the first line segment 29a of the central region cells 2a is a length $(L1a + \frac{1}{2}L1b + \frac{1}{2}L1c)$ obtained by adding the width L1a at open end, the length of half of thickness L1b of each partition wall 1, and the length of half the thickness L1c of the partition wall 1.

FIG. 7 is a partially enlarged sectional view in which a part of the boundary portion 23 of the crass section shown in FIG. 5 is enlarged. Also in the boundary portion 23, the cell pitch L2 of the small cell-pitch cells 2c formed in the boundary portion 23 can be obtained by a method similar to the abovementioned method for the central region. Furthermore, although not shown in the drawing, also in the circumferential region, the cell pitch L3 (see FIG. 5) of the circumferential region cells 2b formed in the circumferential region can be obtained by a method similar to the above-mentioned method for the central region.

FIG. 8 is a partially enlarged sectional view in which the circumferential region 21 and a part of the boundary portion 23 formed in the circumferential region 21 of the cross section shown in FIG. 5 are enlarged. In FIG. 8, the boundary portion 23 is formed on a boundary side of the circumferential region 21. As shown in FIG. 8, also when the boundary portion 23 is formed in the circumferential region 21, the cell pitch L2 of the small cell-pitch cells 2c formed in the boundary portion 23 can be obtained in the same manner as in the abovementioned central region.

Figure 9:
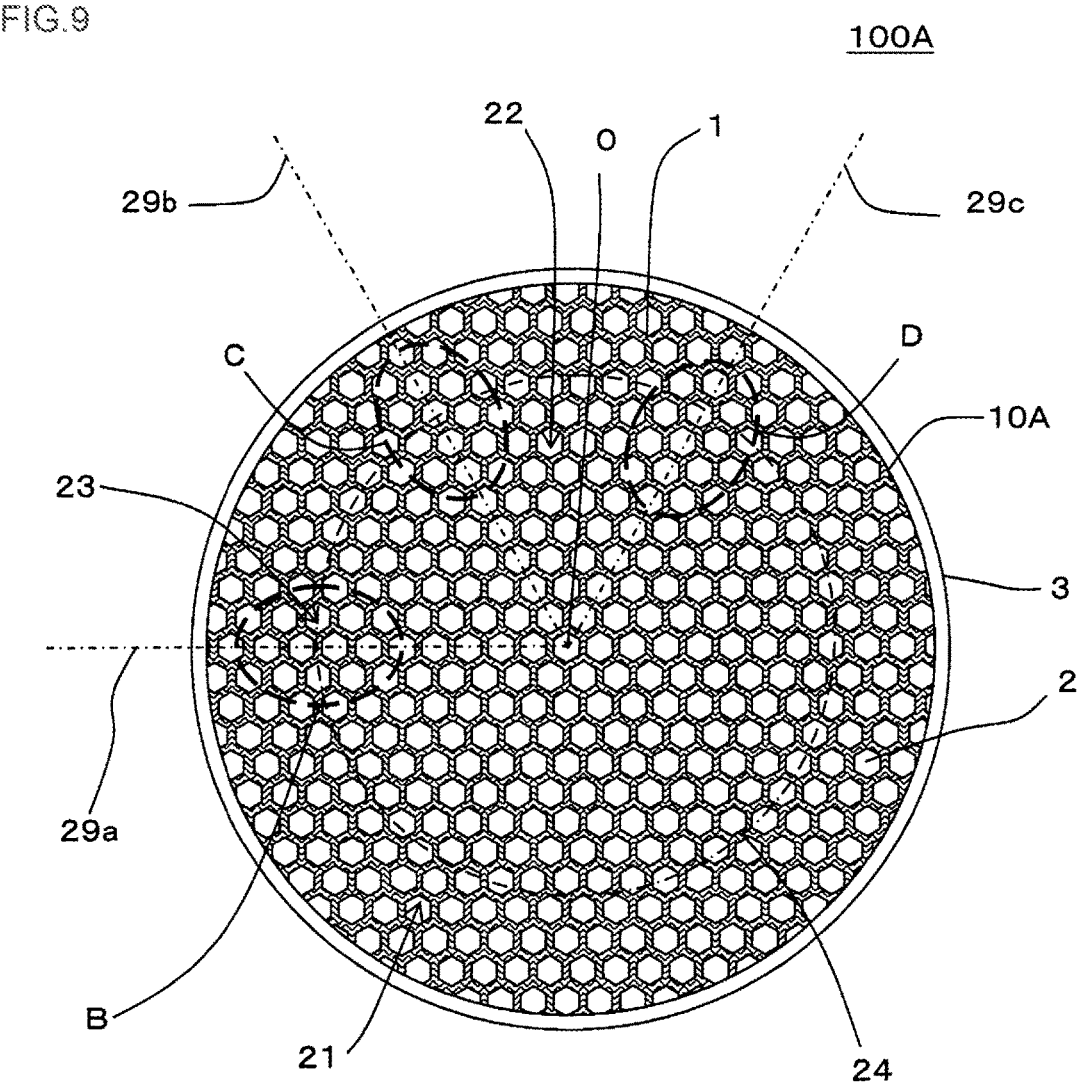
FIG. 9 is a sectional view schematically showing a cross section perpendicular to a cell extending direction of another embodiment of the honeycomb structure of the present invention.
Figure 10:
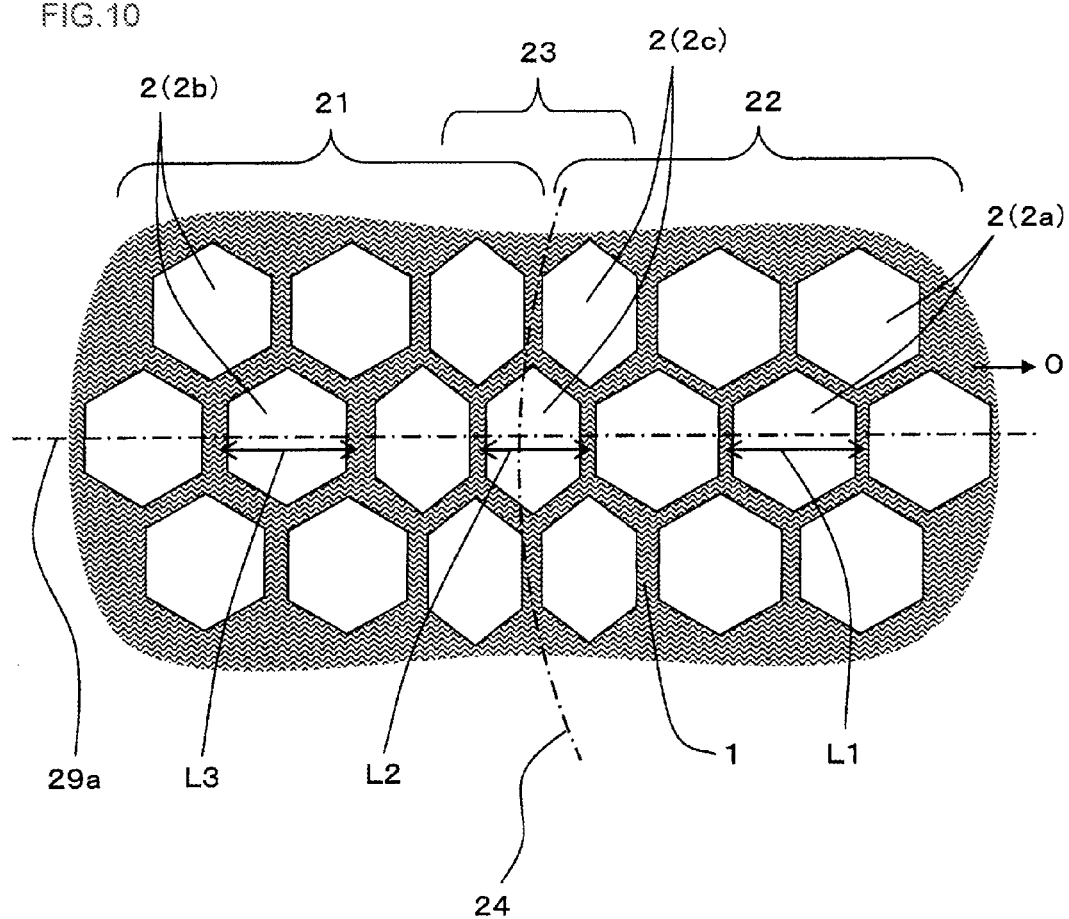
FIG. 10 is an enlarged sectional view schematically showing a range shown in B of FIG. 9.
Figure 11:
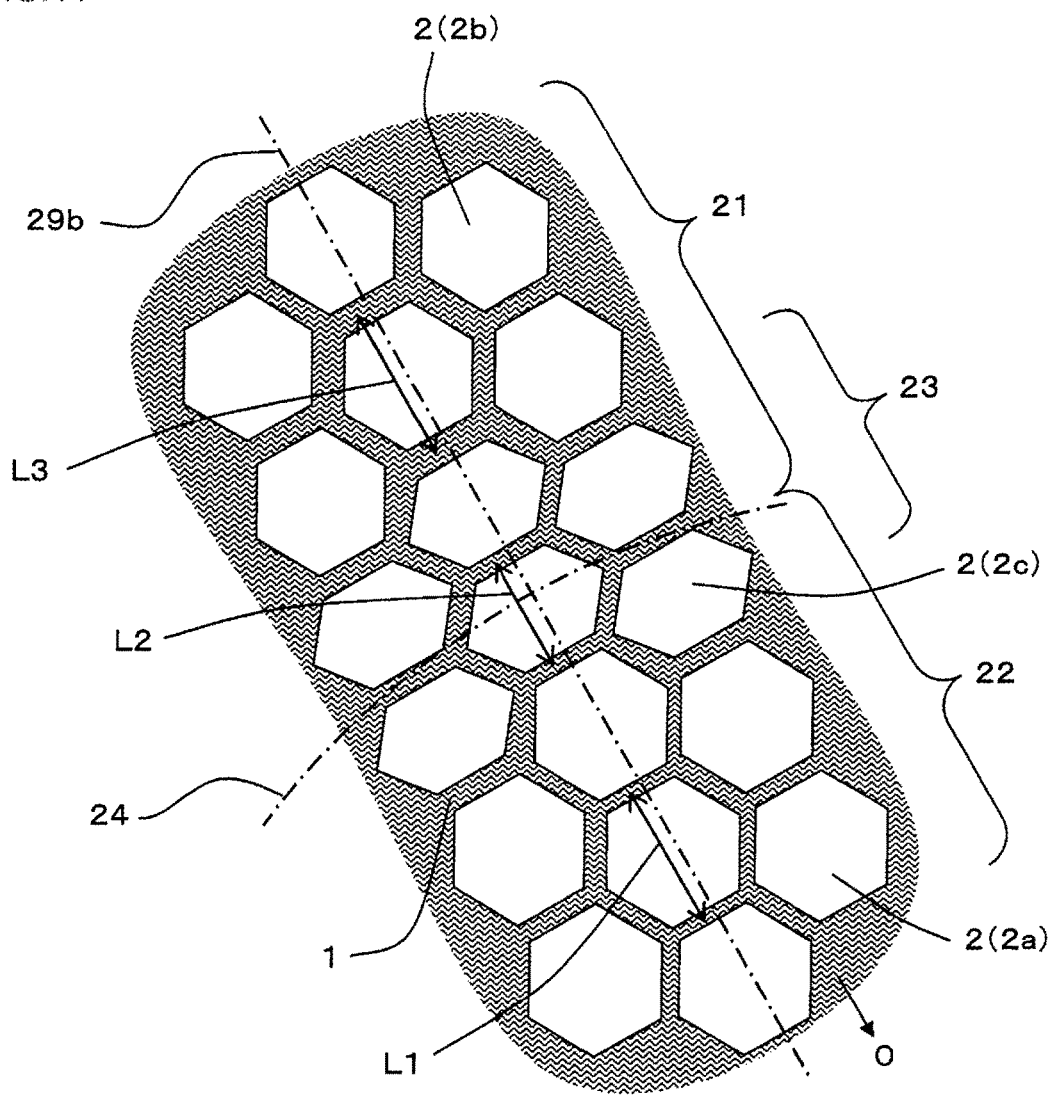
FIG. 11 is an enlarged sectional view schematically showing a range shown in C of FIG. 9.
Figure 12:
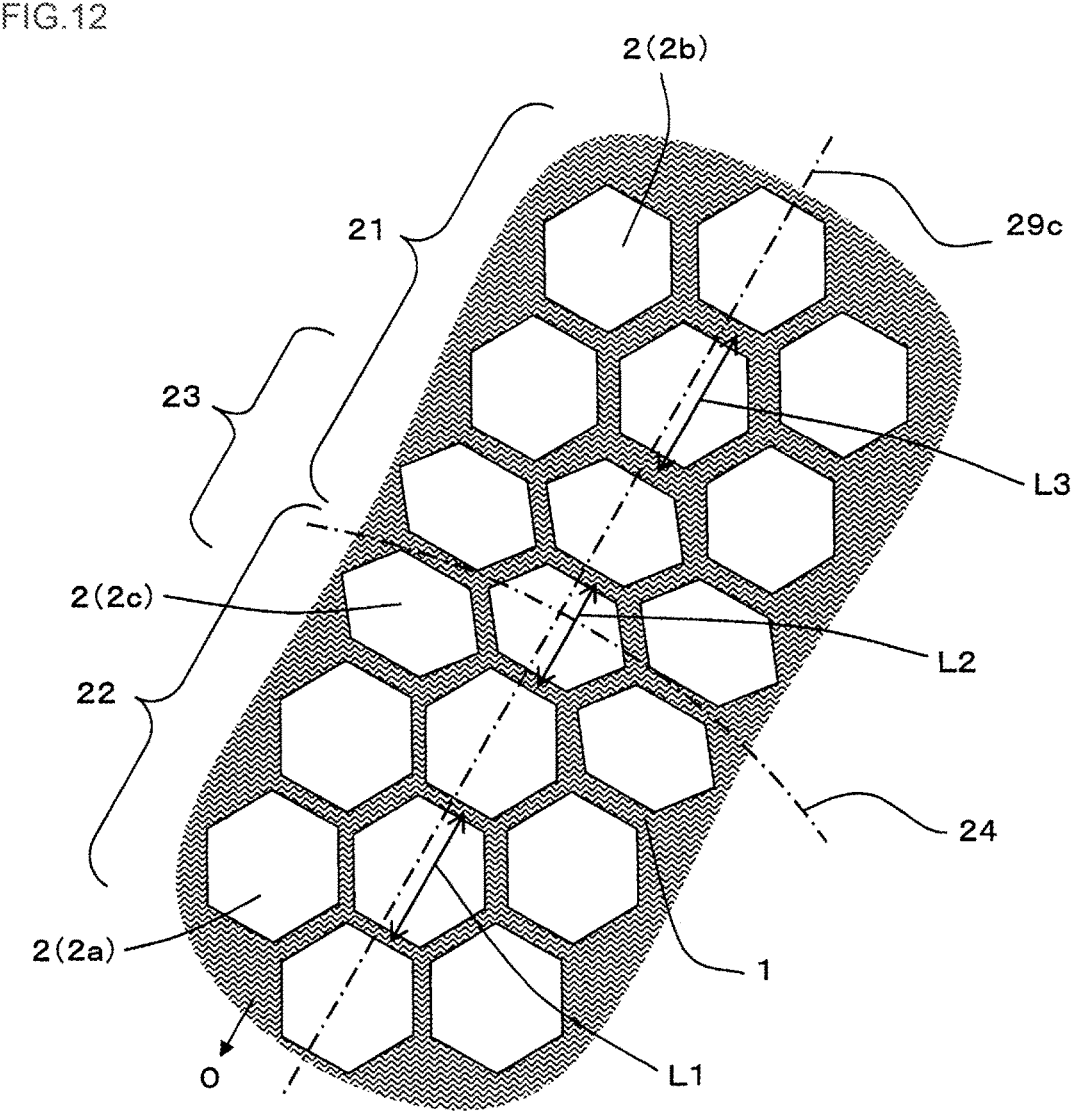
FIG. 12 is an enlarged sectional view schematically showing a range shown in D of FIG. 9.

In the honeycomb structure 100 shown in FIG. 1 to FIG. 4 described hitherto, the respective five or less cells 2c each arranged on the first line segment 29a toward each of the central region 22 and the circumferential region 21 from the boundary 24 are "small cell-pitch cells 2c". However, there may be a plurality of line segments extending in a direction perpendicular to partition walls each constituting one side of each polygonal cell in the cross section of the honeycomb structure. Consequently, in the honeycomb structure of the present invention, another line segment extending in a direction perpendicular to a partition wall constituting another side other than the above one side of the polygonal cell may be a second line segment, and also on the second line segment, a constitution similar to the constitution described hitherto can be employed. That is, the honeycomb structure of the present invention may be, for example, a honeycomb structure 100A shown in FIG. 9 to FIG. 12. Here, FIG. 9 is a sectional view schematically showing a cross section perpendicular to a cell extending direction of another embodiment of the honeycomb structure of the present invention. FIG. 10 is an enlarged sectional view schematically showing a range shown in B of FIG. 9. FIG. 11 is an enlarged sectional view schematically showing a range shown in C of FIG. 9. FIG. 12 is an enlarged sectional view schematically showing a range shown in D of FIG. 9.

As shown in FIG. 9 to FIG. 12, the honeycomb structure 100A includes a tubular honeycomb structure body 10A having porous partition walls 1 to define a plurality of cells 2 extending from a first end face 11 to a second end face 12. It is to be noted that in FIG. 9 to FIG. 12, constitutional elements constituted similarly to the honeycomb structure 100 shown in FIG. 1 to FIG. 4 are denoted with the same reference numbers and description thereof may be omitted. In the cross section of the honeycomb structure body 10A, the other line segments passing center of gravity O of the cross section and extending in a direction perpendicular to the partition walls 1 constituting the other sides other than the one side of each polygonal cell 2 are to be a second line segment 29b and a third line segment 29c, respectively. A sectional shape of the cells 2 formed in the honeycomb structure body 10A is hexagonal, and hence the number of the abovementioned "other line segments extending in the direction perpendicular to the partition walls 1" is two.

The honeycomb structure body 10A of the honeycomb structure 100A shown in FIG. 9 is constituted so that a thickness of the partition walls 1 is relatively small in a central region 22 and a thickness of the partition walls 1 is relatively large in a circumferential region 21. The thicknesses of the partition walls 1 to define the respective cells 2 in the central region 22 and the circumferential region 21 are different from each other and are demarcated by a boundary 24. That is, the thickness of the partition walls 1 to define the central region cells 2a is relatively small and the thickness of the partition walls 1 to define the circumferential region cells 2b is relatively large. Furthermore, the plurality of cells 2 are arranged on the first line segment 29a, the second line segment 29b and the third line segment 29c in extending directions of the respective line segments.

In the honeycomb structure of the present embodiment, as shown in FIG. 10, for respective five or less cells 2c each arranged on the first line segment 29a toward each of the central region 22 and the circumferential region 21 from the boundary 24 among the cells 2 arranged on the first line segment 29a, a cell pitch of the cells 2c becomes smaller. Furthermore, as shown in FIG. 11, for the respective five or less cells 2c each arranged on the second line segment 29b toward each of the central region 22 and the circumferential region 21 from the boundary 24 among the cells 2 arranged on the second line segment 29b, the cell pitch of the cells 2c becomes smaller. Furthermore, as shown in FIG. 12, for the respective five or less cells 2c each arranged on the third line segment 29c toward each of the central region 22 and the circumferential region 21 from the boundary 24 among the cells 2 arranged on the third line segment 29c, the cell pitch of the cells 2c becomes smaller. Here, in the respective five or less cells 2c each arranged on the second line segment 29b toward each of the central region 22 and the circumferential region 21 from the boundary 24 among the cells 2 arranged on the second line segment 29b in FIG. 11, the cells 2c having a decreased cell pitch are referred to as small cell-pitch cells. Similarly, in the respective five or less cells 2c each arranged on the third line segment 29c toward each of the central region 22 and the circumferential region 21 from the boundary 24 among the cells 2 arranged on the third line segment 29c in FIG. 12, the cells 2c having a decreased cell pitch are referred to as small cell-pitch cells. In this way, also on the other line segments extending in the direction perpendicular to the partition walls 1 constituting the other sides other than the one side of each of the polygonal cells 2, the small cell-pitch cells 2c having the decreased cell pitch are disposed, so that the thermal shock resistance of the boundary portion 23 can be enhanced. Among the cells 2 arranged on the second line segment 29b in FIG. 11, a cell pitch L2 of the small cell-pitch cells 2c preferably has a size of 70% or more and 95% or less to a cell pitch L1 of cells 2a arranged on the second line segment 29b in the central region 22. Among the cells 2 arranged on the second line segment 29b in FIG. 11, the cell pitch L2 of the small cell-pitch cells 2c preferably has a size of 70% or more and 95% or less to a cell pitch L3 of the cells 2b arranged on the second line segment 29b in the circumferential region 21. Among the cells 2 arranged on the third line segment 29c in FIG. 12, the cell pitch L2 of the small cell-pitch cells 2c preferably has a size of 70% or more and 95% or less to the cell pitch L1 of the cells 2a arranged on the third line segment 29c in the central region 22. Among the cells 2 arranged on the third line segment 29c in FIG. 12, the cell pitch L2 of the small cell-pitch cells 2c preferably has a size of 70% or more and 95% or less to the cell pitch L3 of the cells 2b arranged on the third line segment 29c in the circumferential region 21.

A range in which the small cell-pitch cells 2c are disposed is, for example, on the first line segment 29a, a range in which the respective five or less cells 2c each arranged on the first line segment 29a toward each of the central region 22 and the circumferential region 21 from the boundary 24 are formed. That is, at most ten cells 2c in the boundary portion 23 between the central region 22 and the circumferential region 21 are the small cell-pitch cells 2c. In other words, the small cell-pitch cells 2c are constituted of one to ten cells each arranged on the first line segment 29a toward each of the central region 22 and the circumferential region 21 from the boundary 24. The small cell-pitch cells 2c are preferably constituted of two to nine cells each arranged on the line segment, and further preferably constituted of three to eight cells each arranged on the line segment. For example, when eleven cells or more arranged on the line segment are the small cell-pitch cells 2c, there is the fear that cracks are generated by thermal shock in a portion where the cell pitch is usual in the vicinity of the small cell pitch. Furthermore, it is also important that the respective five or less cells 2 arranged across the boundary 24 between the central region 22 and the circumferential region 21 become the small cell-pitch cells 2c. That is, even when the small cell-pitch cells 2c are formed away from the boundary 24, the effect of improving a thermal shock resistance is not sufficiently exhibited. Specifically, heat stress generated during the temperature rise or drop of the honeycomb structure 100 concentrates on the boundary 24 between the central region 22 and the circumferential region 21 where the thickness of the partition walls 1 decreases, and larger thermal shock is disadvantageously applied to the boundary 24. Therefore, even when the small cell-pitch cells 2c are formed in a portion away from the boundary 24, the effect of improving the thermal shock resistance is not sufficiently exhibited.

Figure 13:
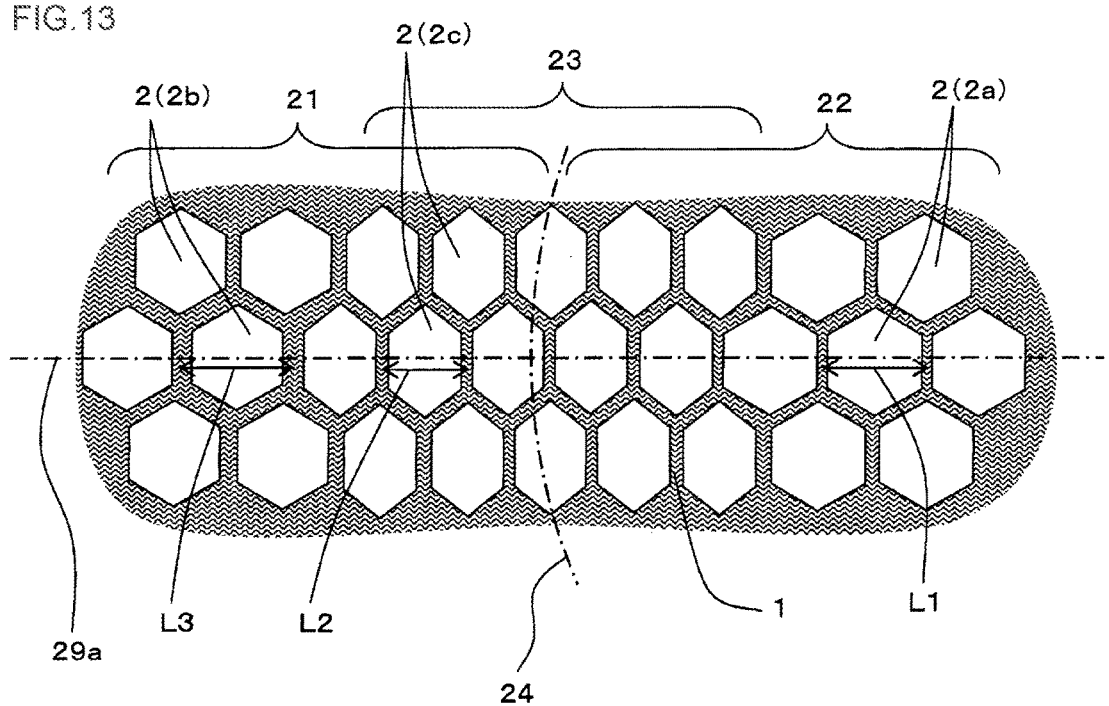
FIG. 13 is an enlarged sectional view schematically showing a cross section perpendicular to a cell extending direction of still another embodiment of the honeycomb structure of the present invention.

In FIG. 10, the two cells 2 arranged in the extending direction of the first line segment 29a are the small cell-pitch cells 2c. For example, as shown in FIG. 13, the five cells 2 arranged in the extending direction of the first line segment 29a may be the small cell-pitch cells 2c. FIG. 13 is an enlarged sectional view schematically showing a cross section perpendicular to a cell extending direction of still another embodiment of the honeycomb structure of the present invention. In FIG. 13, constitutional elements constituted similarly to FIG. 10 are denoted with the same reference numbers and description thereof is omitted.

Figure 14:
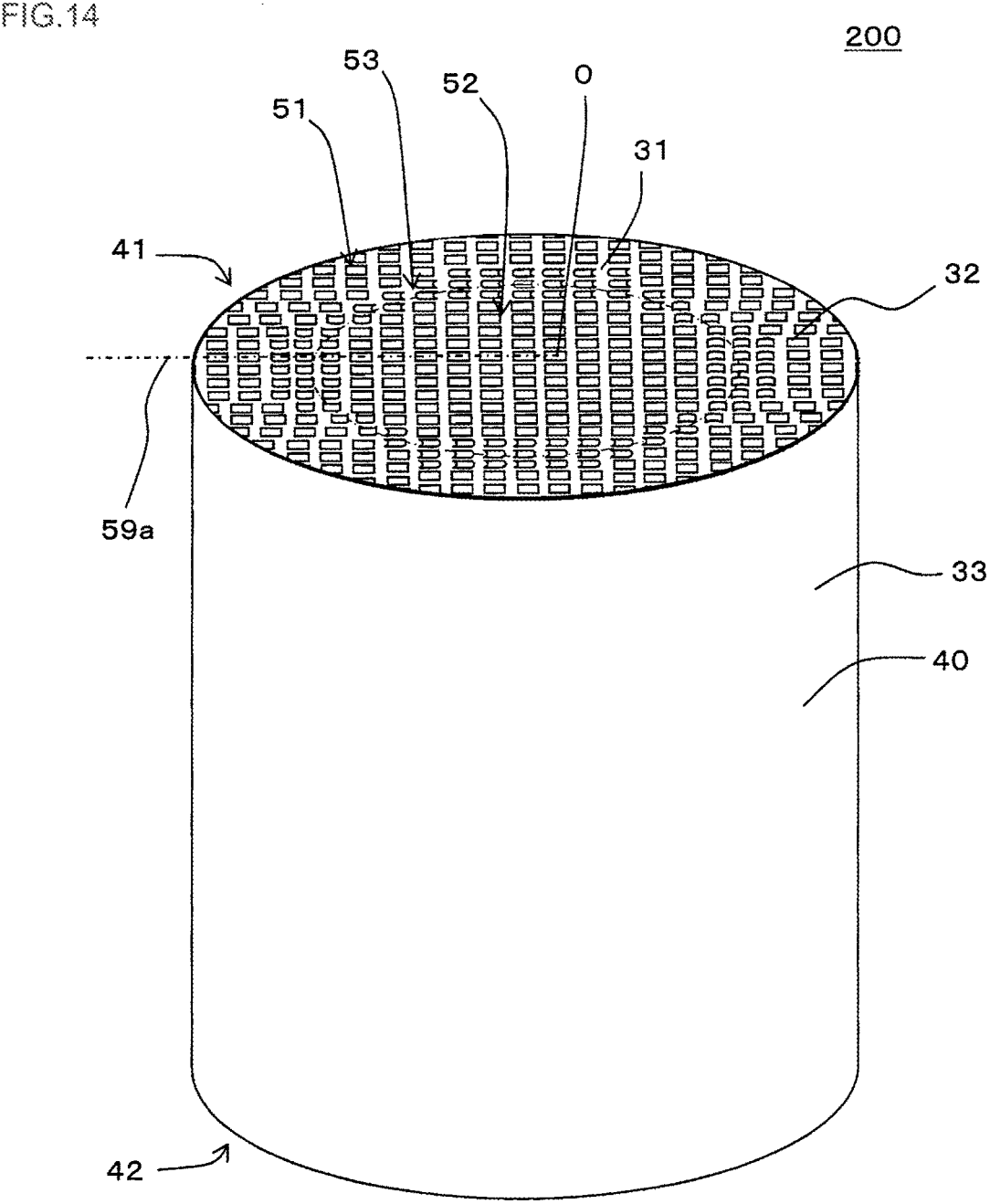
FIG. 14 is a perspective view schematically showing a further embodiment of the honeycomb structure of the present invention.
Figure 15:
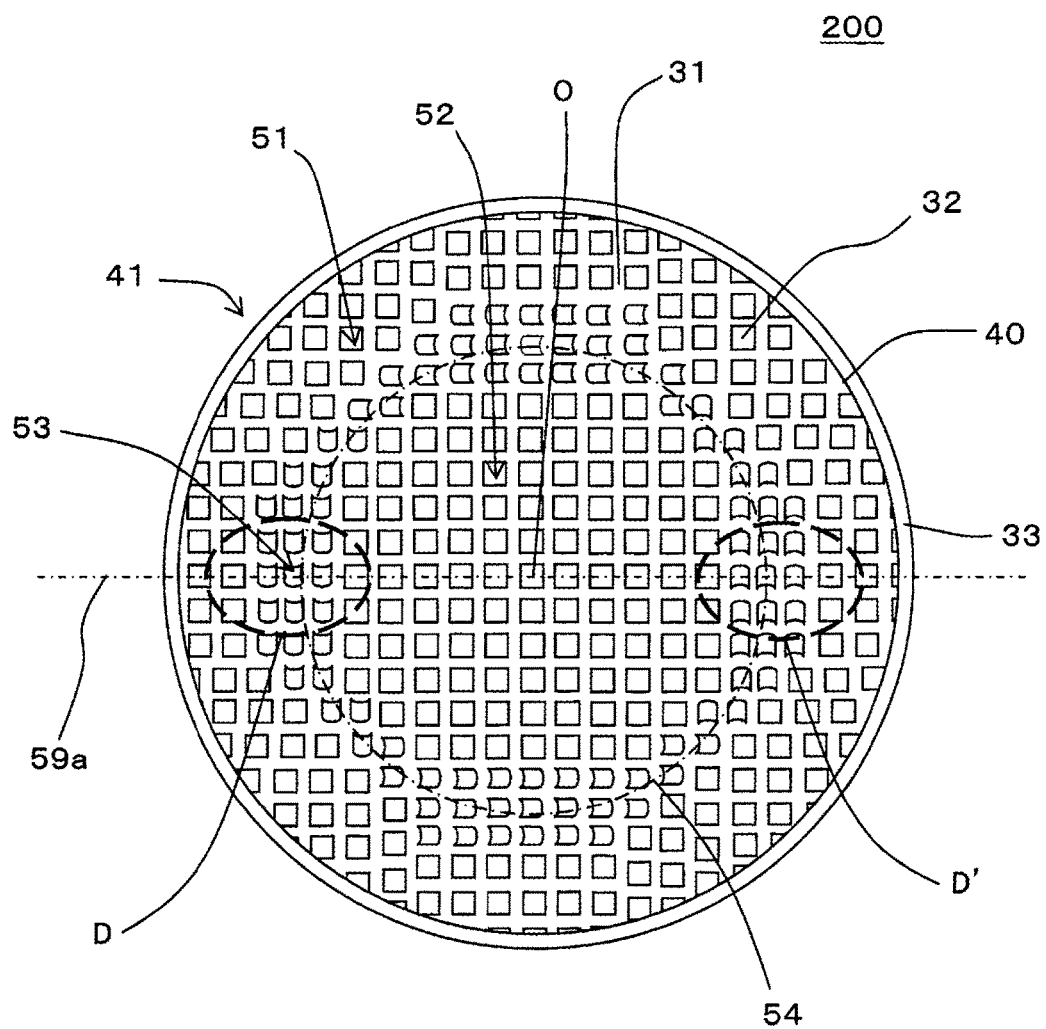
FIG. 15 is a plan view schematically showing a first end face of the further embodiment of the honeycomb structure of the present invention.
Figure 16:
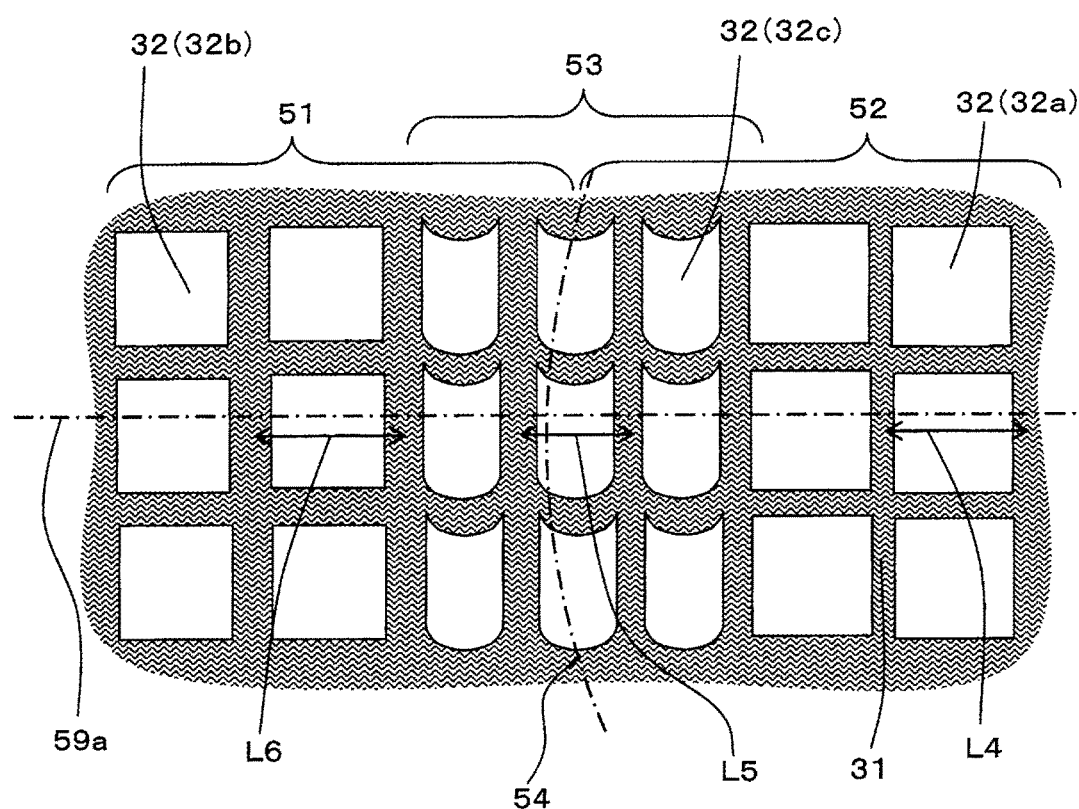
FIG. 16 is an enlarged sectional view schematically showing a part of a cross section perpendicular to a cell extending direction of the further embodiment of the honeycomb structure of the present invention.

In the honeycomb structure 100 shown in FIG. 1 to FIG. 4, the sectional shape of the cells is hexagonal, but the cells may have a polygonal sectional shape other than the hexagonal sectional shape. For example, in a honeycomb structure 200 shown in FIG. 14 to FIG. 16, a sectional shape of cells 32 is quadrangular. Here, FIG. 14 is a perspective view schematically showing a further embodiment of the honeycomb structure of the present invention. FIG. 15 is a plan view schematically showing a first end face of the further embodiment of the honeycomb structure of the present invention. FIG. 16 is an enlarged sectional view schematically showing a part of a cross section perpendicular to a cell extending direction of the further embodiment of the honeycomb structure of the present invention.

The honeycomb structure 200 includes a tubular honeycomb structure body 40 having porous partition walls 31 to define the plurality of cells 32 extending from a first end face 41 to a second end face 42. In the honeycomb structure 200, the honeycomb structure body 40 has a circumferential wall 33 disposed at the outermost circumference so as to surround the partition walls 31. The honeycomb structure body 40 is constituted so that a thickness of the partition walls 31 in a circumferential region 51 positioned at an outer side of a central region 52 is larger than a thickness of the partition walls 31 in the central region 52 including a center of gravity O in a cross section perpendicular to an extending direction of the cells 32.

In the cross section perpendicular to the extending direction of the cells 32 of the honeycomb structure body 40, one line segment passing the center of gravity O of the cross section and extending in a direction perpendicular to the partition walls 31 each constituting one side of each of the cells 32 is to be a first line segment 59a. On the first line segment 59a, plurality of cells 32 are arranged in an extending direction of the first line segment 59a. Here, among the cells 32 arranged on the first line segment 59a, the cells 32 present in the central region 52 are central region cells 32a. Furthermore, among the cells 32 arranged on the first line segment 59a, the cells 32 present in the circumferential region 51 are circumferential region cells 32b. Thicknesses of the partition walls 31 which define the respective cells 32 of the central region 52 and the circumferential region 51 are different from each other and are demarcated by a boundary 54. Furthermore, for respective five or less cells 32c each arranged on the first line segment 59a toward each of the central region 22 and the circumferential region 21 from the boundary 54 among the cells 32 arranged on the first line segment 59a, a cell pitch of the cells 32c is smaller as compared with the other cells 32. That is, a cell pitch L5 of the small cell-pitch cells 32c in the extending direction of the first line segment 59a has a size of 70% or more and 95% or less to a cell pitch L4 of the central region cells 32a. Furthermore, the cell pitch L5 of the small cell-pitch cells 32c in the extending direction of the first line segment 59a preferably has a size of 70% or more and 95% or less to a cell pitch L6 of the circumferential region cells 32b. Furthermore, when another line segment extending in a direction perpendicular to the partition walls 31 constituting sides other than the one side of the quadrangular cell 32 is to be a second line segment, the small cell-pitch cells 32c may be disposed on the second line segment. In this way, even for the honeycomb structure in which the sectional shape of the cells is quadrangular, there can be employed a constitution similar to that of the honeycomb structure in which the sectional shape of the cells is hexagonal as described hitherto.

Figure 17:
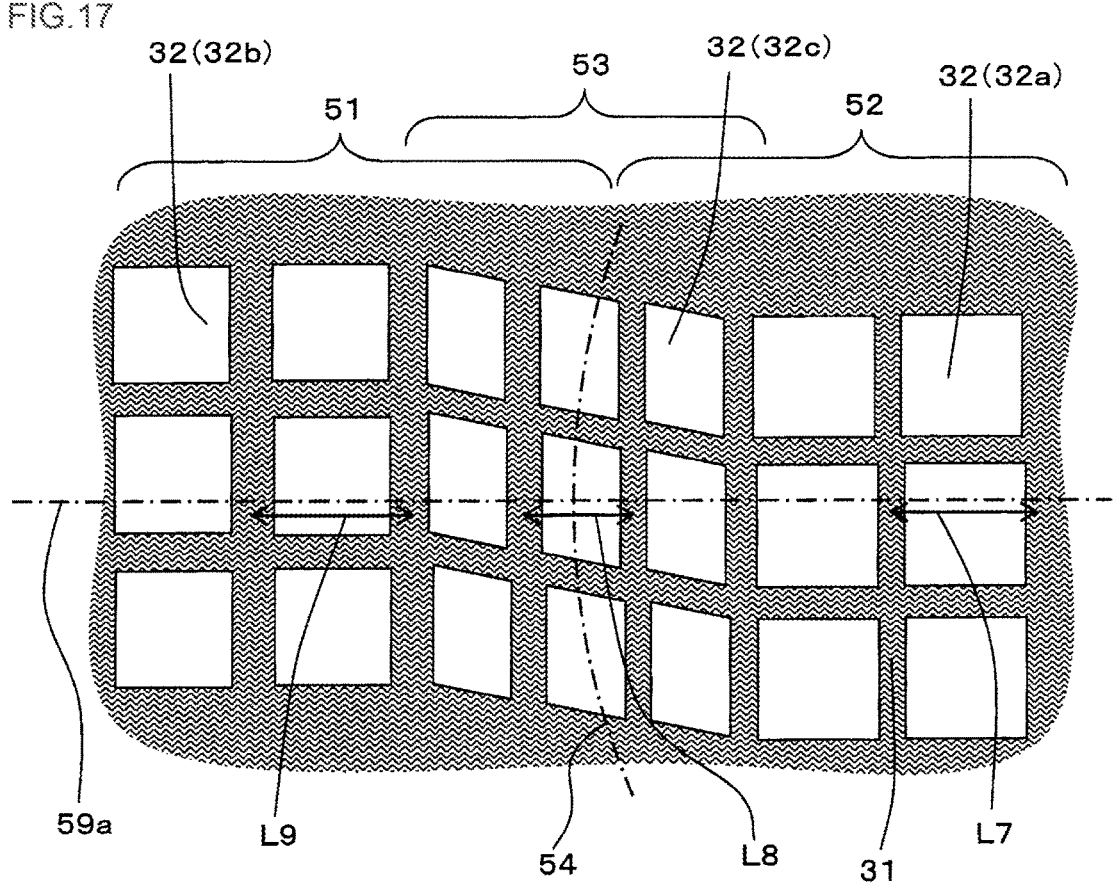
FIG. 17 is an enlarged sectional view schematically showing a part of a cross section perpendicular to a cell extending direction of a further embodiment of the honeycomb structure of the present invention.

Here, in FIG. 16, the small cell-pitch cells 32c have a quadrangular sectional shape whose two sides in the extending direction of the first line segment 59a are circularly curved. The small cell-pitch cells may have, for example, a quadrangular sectional shape in which at least one side of the sectional shape is curved, as long as the cell pitch L5 of the small cell-pitch cells 32c has a size of 70% or more and 95% or less to the cell pitch L4 of the central region cells 32a. That is, for the sectional shape of the small cell-pitch cells 32c, a shape of the cells 32 (32a) formed in the central region 52 excluding the small cell-pitch cells 32c may be contracted in at least the extending direction of the first line segment 59a. For example, FIG. 17 is an enlarged sectional view schematically showing a part of a cross section perpendicular to a cell extending direction of a further embodiment of the honeycomb structure of the present invention. In FIG. 17, constitutional elements constituted similarly to FIG. 16 are denoted with the same reference numbers and description thereof is omitted. In FIG. 17, a sectional shape of the small cell-pitch cells 32c is a parallelogram. On the other hand, a sectional shape of the central region cells 32a formed in the central region 52 is a square. When the sectional shape of the central region cells 32a is contracted in the extending direction of the first line segment 59a, the sectional shape may be a quadrangular shape whose two sides are circularly curved as shown in FIG. 16 or a parallelogram as shown in FIG. 17. Furthermore, for the abovementioned quadrangular cell whose two sides are circularly curved or the abovementioned parallelogrammatic cell, a width at an open end in the extending direction of the first line segment 59a of each cell is smaller as compared with the central region cell 32a. As a result, the cell pitch L5 of the small cell-pitch cell 32c is smaller than the cell pitch L4 of the central region cell 32a (see FIG. 16).

Hereinafter, for the honeycomb structure of the present embodiment, each constitutional element will be described in more detail.

(1-1) Honeycomb Structure Body:

As described above, the honeycomb structure body 10 shown in FIG. 1 to FIG. 4 has the porous partition walls 1 and the circumferential wall 3 disposed at the outermost circumference so as to surround the partition walls 1. The circumferential wall 3 may be formed together with the partition walls 1 during extrusion of a honeycomb formed body in a process of preparing the honeycomb structure body 10. Furthermore, the circumferential wall 3 does not have to be formed during the extrusion. For example, the circumferential wall 3 can be formed by applying a ceramic material to a circumferential portion of each of the partition walls 1 which define the cells 2. Furthermore, the circumferential wall 3 can be formed by grinding a circumferential portion of the honeycomb structure body 10 to remove the circumferential portion once and then applying the ceramic material so as to surround the partition walls 1.

There is not any special restriction on a shape of the honeycomb structure body. Examples of the shape of the honeycomb structure body include a tubular shape in which end faces of the honeycomb structure body are circular (a cylindrical shape), a tubular shape whose end faces are oval, and a tubular shape whose end faces are polygonal. Examples of the polygonal shape include a quadrangular shape, a pentangular shape, a hexagonal shape, a heptagonal shape, and an octagonal shape. FIG. 1 to FIG. 4 show an example where the honeycomb structure body 10 has a tubular shape in which end faces are circular.

The partition walls of the honeycomb structure body preferably include a ceramic material as a main component. An example of a material of the partition walls is preferably at least one selected from the following group. That is, the material is preferably at least one selected from the group consisting of silicon carbide, a silicon-silicon carbide based composite material, cordierite, mullite, alumina, spinel, a silicon carbide-cordierite based composite material, lithium aluminum silicate, and aluminum titanate. Among these materials, cordierite is preferable. When the material is cordierite, it is possible to obtain the honeycomb structure having a small thermal expansion coefficient and an excellent thermal shock resistance. Here, "main component" means a component contained as much as 50 mass % or more in the material constituting the partition walls. The partition walls are made of a material including preferably 80 mass % or more and further preferably 90 mass % or more of at least one selected from the above group.

A thickness of the partition walls is preferably from 40 to 400 μm, further preferably from 50 to 170 μm, and especially preferably from 50 to 120 μm. When the thickness of the partition walls is in the above numerical value range, it is possible to inhibit an increase of a pressure loss of the honeycomb structure while maintaining strength of the partition walls. The honeycomb structure of the present embodiment is constituted so that the thickness of the partition walls is relatively small in the central region, and the thickness of the partition walls is relatively large in the circumferential region. Therefore, the thickness of the partition walls of the circumferential region is preferably from 1.05 to 1.8 times, further preferably from 1.05 to 1.6 times, and especially preferably from 1.05 to 1.4 times the thickness of the partition walls of the central region.

Furthermore, the thickness of the partition walls in the circumferential region excluding a region where the small cell-pitch cells are formed among the cells arranged on the first line segment is preferably a thickness of 1.05 to 1.8 times the thickness of the partition walls in the central region excluding the region where the small cell-pitch cells are formed. Additionally, "circumferential region" simply mentioned hereinafter means "circumferential region excluding the region where the small cell-pitch cells are formed". Furthermore, "central region" simply mentioned hereinafter means "central region excluding the region where small cell-pitch cells are formed". The thickness of the partition walls in the circumferential region is further preferably a thickness of 1.05 to 1.6 times and especially preferably a thickness of 1.05 to 1.4 times the thickness of the partition walls in the central region. Furthermore, the thickness of the partition walls in the boundary portion where the small cell-pitch cells are formed is preferably from 1.0 to 1.8 times the thickness of the partition walls in the central region where the boundary portion is present.

A cell density of the honeycomb structure body is preferably from 30 to 150 cells/cm². When the cell density is in the above numerical value range, an increase of the pressure loss can effectively be prevented. The cell density of the honeycomb structure body means the number of the cells per unit area in the cross section perpendicular to the extending direction of the cells. The cell density of the honeycomb structure body is further preferably from 60 to 150 cells/cm² and especially preferably from 90 to 150 cells/cm². It is to be noted that in the honeycomb structure of the present embodiment, a value of the cell density of each of the central region and the circumferential region is different from that of the boundary portion where the small cell-pitch cells are formed. Furthermore, the cell densities of the central region and the circumferential region may have different values or the same value.

In the cells arranged on the first line segment, the cell pitch of the cells formed in the central region and the cell pitch of the cells formed in the circumferential region may have the same size or different sizes. For example, the cell pitch of the cells formed in the central region excluding the small cell-pitch cells may be smaller than that of the cells formed in the circumferential region excluding the small cell-pitch cells.

A porosity of the partition walls is preferably from 20 to 60%, further preferably from 25 to 50%, and especially preferably from 25 to 40%. When the porosity is smaller than 20%, the amount of the catalyst to be loaded in pores of the partition walls decreases in the case of the use of the honeycomb structure as a catalyst carrier, and characteristics concerning the loading of the catalyst onto the honeycomb structure may be deteriorated. When the porosity is larger than 60%, the strength of the honeycomb structure body may be deteriorated. The porosity of the partition walls can be measured by a mercury porosimeter. An example of the mercury porosimeter is Autopore 9500 (trade name) manufactured by Micromeritics Co.

A length from the first end face to the second end face of the honeycomb structure body is preferably from 50 to 170 mm and further preferably from 80 to 130 mm. However, the length from the first end face to the second end face of the honeycomb structure body is not limited to the above numerical value range, and may suitably be selected so as to obtain an optimum purification performance, when the honeycomb structure is used in each type of exhaust gas purification device.

There is not any special restriction on a size of the honeycomb structure body in a cross section perpendicular to an extending direction from the first end face to the second end face, and the size may suitably be selected so as to obtain the optimum purification performance when the honeycomb structure is used in each type of exhaust gas purification device. It is to be noted that when the shape of the cross section is circular in the honeycomb structure of the present embodiment, a diameter of this cross section is preferably from 70 to 170 mm and further preferably from 75 to 150 mm.

A material of the circumferential wall may be the same as in the partition walls or may be different from that of the partition walls. For example, the circumferential wall preferably includes at least one selected from the group consisting of silicon carbide, a silicon-silicon carbide based composite material, cordierite, mullite, alumina, spinel, a silicon carbide-cordierite based composite material, lithium aluminum silicate, and aluminum titanate. According to such a constitution, the honeycomb structure body excellent in thermal resistance is obtained.

(1-2) Other Constitutional Elements:

The honeycomb structure of the present embodiment may include plugging portions disposed in open ends of predetermined cells (first cells) in the first end face and open ends of residual cells (second cells) in the second end face. The first cells and the second cells are preferably alternately arranged. Furthermore, checkered patterns are preferably formed in both end faces of the honeycomb structure by the plugging portions and "the open ends of the cells". A material of the plugging portions is preferably a material which is considered to be preferable as the material of the partition walls. The material of the plugging portions and the material of the partition walls may be the same material or different materials. Such a honeycomb structure may suitably be used as a filter to trap a particulate matter in the exhaust gas.

Furthermore, in the honeycomb structure of the present embodiment, the catalyst may be loaded on the surfaces of the partition walls and the insides of the pores formed in the partition walls. Examples of the catalyst include various catalysts such as a ternary catalyst, a $NO_x$ storage reduction catalyst, an oxidation catalyst, and a $NO_x$ selective reduction catalyst including a metal-substituted zeolite as a main component. An example of a method of loading the catalyst onto the surfaces of the partition walls and the insides of the pores formed in the partition walls is a method in which heretofore known slurry for the catalyst is used. The slurry for the catalyst may contain a noble metal, a catalytic assistant, a noble metal holding material or the like in addition to the catalyst. Examples of the noble metal include platinum, rhodium and palladium. Examples of the catalytic assistant include alumina, zirconia and ceria.

(2) Manufacturing Method of Honeycomb Structure:

Next, a manufacturing method of the honeycomb structure of the present invention will be described. First, a forming raw material containing a ceramic raw material is formed to obtain a tubular honeycomb formed body including partition walls (the partition walls prior to firing) to define the plurality of cells that become through channels for a fluid and a circumferential wall (the circumferential wall prior to the firing) positioned at the outermost circumference.

An example of the ceramic raw material to be contained in the forming raw material is preferably at least one selected from the following ceramic "raw material group". The "raw material group" is a "group consisting of silicon carbide, a silicon-silicon carbide composite material, a cordierite forming raw material, cordierite, mullite, alumina, spinel, a silicon carbide-cordierite composite material, lithium aluminum silicate, and aluminum titanate". These raw materials are used, so that it is possible to obtain the honeycomb structure excellent in strength and thermal resistance. It is to be noted that the cordierite forming raw material is a ceramic raw material blended to obtain a chemical composition in which silica is in a range of 42 to 56 mass %, alumina is in a range of 30 to 45 mass %, and magnesia is in a range of 12 to 16 mass %, and the cordierite forming raw material is fired to become cordierite. Examples of a raw material component that becomes a silica source (a silica source component) include quartz and molten silica. As a raw material component that becomes an alumina source (an alumina source component), at least one of aluminum oxide and aluminum hydroxide is preferably used (both of the components may be used) because these components include less impurities. Examples of a raw material component that becomes a magnesia source (a magnesia source component) include talc and magnesite. For talc as the magnesia source component, an average particle diameter is preferably from 10 to 30 μm. Furthermore, the magnesia source component may contain $Fe_2O_3$, CaO, $Na_2O$, $K_2O$ and the like as the impurities.

The forming raw material is preferably prepared by mixing the above ceramic raw material with a pore former, a binder, a dispersing agent, a surfactant, a dispersing medium and the like.

Examples of the pore former include graphite, flour, starch, resin balloons, water absorbable polymer, and a "synthetic resin such as solid or hollow 'phenol resin, polymethyl methacrylate, polyethylene, or polyethylene terephthalate'". A content of the pore former is preferably from 1 to 10 mass %, when a content of the ceramic raw material is 100 mass %.

Examples of the binder include hydroxypropyl methylcellulose, methylcellulose, hydroxyethyl cellulose, carboxyl methylcellulose, and polyvinyl alcohol. A content of the binder is preferably from 1 to 10 mass %, when the content of the ceramic raw material is 100 mass %.

Examples of the dispersing agent include dextrin and polyalcohol.

Examples of the surfactant include ethylene glycol and fatty acid soap. A content of the surfactant is preferably from 0.1 to 5 mass %, when the content of the ceramic raw material is 100 mass %.

The dispersing medium is preferably water. A content of the dispersing medium is preferably from 30 to 150 mass %, when the content of the ceramic raw material is 100 mass %.

When the honeycomb formed body is formed by using the forming raw material, the forming raw material is first kneaded to obtain a kneaded material, and the obtained kneaded material is preferably formed into a honeycomb shape.

There is not any special restriction on a method of kneading the forming raw material to form the kneaded material, and an example of the method is a method in which a kneader, a vacuum pugmill or the like is used.

There is not any special restriction on a method of forming the kneaded material to form the honeycomb formed body, and a forming method such as an extrusion method, an injection molding method or a press molding method may be used. The extrusion method is preferably employed, since continuous formation is easily performed and, for example, cordierite crystals can be oriented. The extrusion method can be performed by using a device such as the vacuum pugmill, a ram type extruder, or a biaxial screw type continuous extruder. Furthermore, a die to obtain the honeycomb formed body having desirable partition wall thickness, cell pitch, cell shape and the like is preferably attached to the device for use in the extrusion, to perform the extrusion. A material of the die is preferably stainless steel or cemented carbide which does not easily wear away.

Here, as the die to form the honeycomb formed body, it is preferable to use a die constituted so that a width of a slit of a portion corresponding to the central region of the honeycomb structure body to be obtained is relatively small and a width of a slit of a portion corresponding to the circumferential region is relatively large. Furthermore, during the extrusion, an extruding speed of the kneaded material to be extruded between the portion corresponding to the central region and the portion corresponding to the circumferential region is preferably relatively slow. That is, the extruding speed of the kneaded material of a portion corresponding to the boundary portion where the small cell-pitch cells are formed is preferably slower than the extruding speed of the kneaded material of the portion corresponding to the central region and the circumferential region (and excluding the boundary portion). According to such a constitution, as an extrusion pattern of the kneaded material, the boundary portion where the small cell-pitch cells are formed has a dented shape as compared with the central region and the circumferential region. As a result, the cell pitch of the cells formed in the above boundary portion becomes smaller as compared with the cell pitch of the cells formed in the central region and the circumferential region. Furthermore, when the extruding speed of the kneaded material is adjusted, the cell pitch of the small cell-pitch cells can be set to a size of 70% or more and 95% or less to the cell pitch of the other cells. An example of a method of adjusting the extruding speed of the kneaded material of the portion corresponding to the boundary portion where the small cell-pitch cells are formed is a method of closing a part of a back hole of a portion to be provided with a small cell pitch to the die. A part of the specific back hole is closed in this manner, whereby a flow of the kneaded material to a specific portion (i.e., the portion to be provided with the small cell pitch) can be slowed to partially lower the extruding speed. Furthermore, as the die to form the honeycomb formed body, there may be used a die in which a slit is beforehand formed so that the cell pitch of the cells of the boundary portion including the boundary between the central region and the circumferential region has a size of 70% or more and 95% or less to the cell pitch of the central region. Furthermore, an external force may be applied to the honeycomb formed body which is being extruded or the honeycomb formed body which is once extruded, to form the small cell-pitch cells in the boundary portion between the central region and the circumferential region. Furthermore, the small cell-pitch cells can be formed in the boundary portion between the central region and the circumferential region by its own weight of the honeycomb formed body. For a method of forming the small cell-pitch cells, various methods can be employed.

After the formation of the honeycomb formed body, the obtained honeycomb formed body is preferably dried. There is not any special restriction on a drying method, but examples of the method include hot air drying, microwave drying, dielectric drying, reduced pressure drying, vacuum drying, and freeze drying. Among these methods, the dielectric drying, the microwave drying or the hot air drying is preferably performed alone, or any combination of these methods is preferably performed, because the whole honeycomb formed body can quickly and evenly be dried. Furthermore, drying conditions can suitably be determined in accordance with the drying method.

Next, the honeycomb structure is preferably obtained by firing the obtained honeycomb formed body (main firing). The "main firing" means an operation of sintering and densifying the forming raw material constituting the honeycomb formed body to provide a predetermined strength.

It is to be noted that the honeycomb formed body is preferably calcinated before the honeycomb formed body is fired (main firing). The calcinating is performed for degreasing. There is not any special restriction on a calcinating method, and any method may be used as long as contained organic materials (the binder, the dispersing agent, the pore former, etc.) can be removed. In general, a burning temperature of the binder (organic binder) is from about 100 to 300° C., and a burning temperature of the pore former varies with a type of pore former, however is from about 200 to 1000° C. Therefore, as calcinating condition, heating is preferably performed at about 200 to 1000° C. in an oxidation atmosphere for about three to 100 hours.

Firing conditions (temperature and time) in the main firing vary with the type of forming raw material, and hence conditions may suitably be selected in accordance with the type of forming raw material. For example, when the cordierite forming raw material is used, the firing highest temperature is preferably from 1410 to 1440° C. Furthermore, a firing highest temperature keeping (holding) time is preferably from three to 15 hours.

As described above, the honeycomb structure of the present invention can be manufactured. Furthermore, plugging portions may be disposed in the open ends of the predetermined cells in the first end face and the open ends of the residual cells in the second end face of the honeycomb structure obtained in this manner. There is not any special restriction on a method of disposing the plugging portions, and the plugging portions can be disposed in conformity with a method of disposing the plugging portions in a heretofore known honeycomb structure manufacturing method. Furthermore, the catalyst may be loaded onto the surfaces of the partition walls and the insides of the pores formed in the partition walls of the obtained honeycomb structure. There is not any special restriction on a method of loading the catalyst, and the catalyst can be loaded in conformity with a catalyst loading method in the heretofore known honeycomb structure manufacturing method.

The honeycomb structure of the present invention can be manufactured as described above. However, the manufacturing method of the honeycomb structure of the present invention is not limited to the manufacturing method described hitherto.

EXAMPLES

Hereinafter, the present invention will be described in more detail on the basis of examples, but the present invention is not limited to these examples.

Example 1

First, a kneaded material to form a honeycomb formed body was prepared by using a forming raw material containing a ceramic raw material. As the ceramic raw material, a cordierite forming raw material was used. A dispersing medium, an organic binder, a dispersing agent and a pore former were added to the cordierite forming raw material to prepare the forming kneaded material. An amount of the dispersing medium to be added to 100 parts by mass of cordierite forming raw material was 33 parts by mass. An amount of the organic binder to be added to 100 parts by mass of cordierite forming raw material was 5.6 parts by mass. An amount of the pore former to be added to 100 parts by mass of cordierite forming raw material was 0.5 part by mass. The obtained first ceramic forming raw material was kneaded by using a kneader to obtain the kneaded material.

Next, the obtained kneaded material was extruded by using a vacuum extruder to obtain the honeycomb formed body. As a die, there was used a die in which a slit was formed so that a thickness of partition walls in a circumferential region positioned at an outer side of a central region was larger than a thickness of partition walls in the central region. Furthermore, for this die, there was used the die in which a sectional shape of cells of a honeycomb structure to be obtained was hexagonal. Table 1 shows "thickness (μm) of the partition walls of the central region" and "thickness (μm) of the partition walls of the circumferential region", "cell density (cells/cm$^2$)", "sectional shape of the cells", "diameter (mm) of the end face", and "length (mm)" of the honeycomb structure to be obtained. Furthermore, as the die, there was used a die constituted so that a width of a slit of a portion corresponding to the central region of a honeycomb structure body to be obtained was relatively small and a width of a slit of a portion corresponding to the circumferential region was relatively large. Table 1 shows the thickness of the partition walls of the honeycomb structure to be obtained. Furthermore, for the die used, a part of a back hole of a portion to be provided with a small cell pitch was closed, so that an extruding speed of the kneaded material of a portion corresponding to a boundary portion where small cell-pitch cells were formed was slowed. In this way, there was obtained the honeycomb formed body constituted so that the cell pitch of the cells formed in the above boundary portion was smaller as compared with the cell pitch of the cells formed in the central region and the circumferential region.

Next, the honeycomb formed body was dried by high-frequency dielectric heating, and then dried at 120° C. for two hours by use of a hot air dryer. Afterward, the honeycomb dried body was fired at 1350 to 1440° C. for ten hours to obtain the honeycomb structure constituted as shown in Table 1 and Table 2. In the honeycomb structure of Example 1, the thickness of the partition walls for respective ten cells increased from the cells of the outermost circumference of the honeycomb structure. A region where the thickness of the partition walls increased was the circumferential region, and the other region was the central region. Table 2 shows the "number (cells) of the cells of the circumferential region" and "cell pitch (mm) of central region cells". It is to be noted that the cell pitch (mm) of the central region cells is the cell pitch of the cells excluding after-mentioned small cell-pitch cells among the cells formed in the central region.

Here, one line segment passing center of gravity in a cross section perpendicular to the cell extending direction of the honeycomb structure and extending in a direction perpendicular to the partition walls each constituting one side of each hexagonal cell is to be a first line segment, and an extending direction of the first line segment is to be a "0° direction". Furthermore, a line segment obtained by rotating and moving the above one line segment as much as 60° in a clockwise direction around the center of gravity of the cross section is to be a second line segment, and an extending direction of the second line segment is to be a "60° direction". Furthermore, a line segment obtained by rotating and moving the above one line segment as much as 120° in the clockwise direction around the center of gravity of the cross section is to be a third line segment, and an extending direction of the third line segment is to be a "120° direction".

In the honeycomb structure of Example 1, a cell pitch of fifth to tenth cells from the outermost circumference of the honeycomb structure among the cells arranged on the first line segment was smaller as compared with a cell pitch of central region cells. Specifically, the cell pitch of the central region cells was 0.90 mm and the cell pitch of the ninth cell from the outermost circumference of the honeycomb structure was 0.83 mm. Furthermore, in the honeycomb structure of Example 1, also for cells arranged on the second line segment and the third line segment, a cell pitch in the boundary portion between the central region and the circumferential region was smaller as compared with the cell pitch of the central region cells. The cells having the decreased cell pitch in this manner are referred to as "small cell-pitch cells". Table 1 shows the "presence/absence" of the small cell-pitch cells and "arrangement direction of the small cell-pitch cells (direction of the line segment perpendicular to the partition walls)". Furthermore, Table 2 shows "number (cells) of the cells of the circumferential region", "cell pitch (mm) of the central region cells", "range where the small cell-pitch cells are formed (number of the cells from the outermost circumference", "cell pitch (minimum value) (mm) of the small cell-pitch cells", and "ratio (%) of the cell pitch". Here, the ratio (%) of the cell pitch means a percentage (%) of the cell pitch (mm) of the small cell-pitch cells to the cell pitch (mm) of the central region cells.

For the obtained honeycomb structure, the following "evaluation of thermal shock resistance (1)" and "evaluation of thermal shock resistance (2)" were performed. The evaluation results are shown in Table 3.

[Evaluation of Thermal Shock Resistance (1)]

The thermal shock resistance (1) of the honeycomb structure was evaluated by using a "propane gas burner device" capable of supplying a heating gas into a can member which contains the honeycomb structure. Specifically, the honeycomb structure of each example was contained in the can member (canning), and set in the propane gas burner device. Next, a combustion gas was allowed to flow through the honeycomb structure. The combustion gas was allowed to flow at a flow rate of 50 NL/min. for ten minutes, and a gas temperature in a central portion at a position of 10 mm in front of the honeycomb structure was set to 1000° C. after ten minutes. Afterward, the combustion gas was stopped, cooling air was allowed to flow instead at a flow rate of 250 NL/min. for ten minutes, and a gas temperature in the central portion at the position of 10 mm before the honeycomb structure was set to 100° C. after ten minutes. Such flowing of the combustion gas and the cooling air was regarded as one cycle, and this operation was performed as much as 20 cycles. Afterward, the presence or absence of cracks in the boundary portion between the central region and the circumferential region of the honeycomb structure was visually observed. In this way, the evaluation of the thermal shock resistance (1) of the honeycomb structure was performed. It is considered that a case where the cracks are not confirmed in the boundary portion is a pass, and indicated as "OK" in Table 3. It is considered that a case where the cracks are confirmed in the boundary portion is a failure, and indicated as "NG" in Table 3.

[Evaluation of Thermal Shock Resistance (2)]

The thermal shock resistance (2) of the honeycomb structure was evaluated by a method similar to the "evaluation of the thermal shock resistance (1)" except that the flowing conditions as follows were regarded as one cycle and this operation was performed as much as 20 cycles. First, a combustion gas was allowed to flow at a flow rate of 60 NL/min. for ten minutes, and a gas temperature in a central portion at a position of 10 mm in front of the honeycomb structure was set to 1100° C. after ten minutes. Afterward, the combustion gas was stopped, cooling air was allowed to flow instead at a flow rate of 300 NL/min. for ten minutes, and a gas temperature in the central portion at the position of 10 mm in front of the honeycomb structure was set to 100° C. after ten minutes. It was regarded that such flowing of the combustion gas and the cooling air was one cycle. In the evaluation of the thermal shock resistance (2), it is considered that a case where the cracks are not confirmed in the boundary portion is a pass, and indicated as "OK" in Table 3. It is considered that a case where the cracks are confirmed in the boundary portion is a failure, and indicated as "NG" in Table 3.

Figure 18:
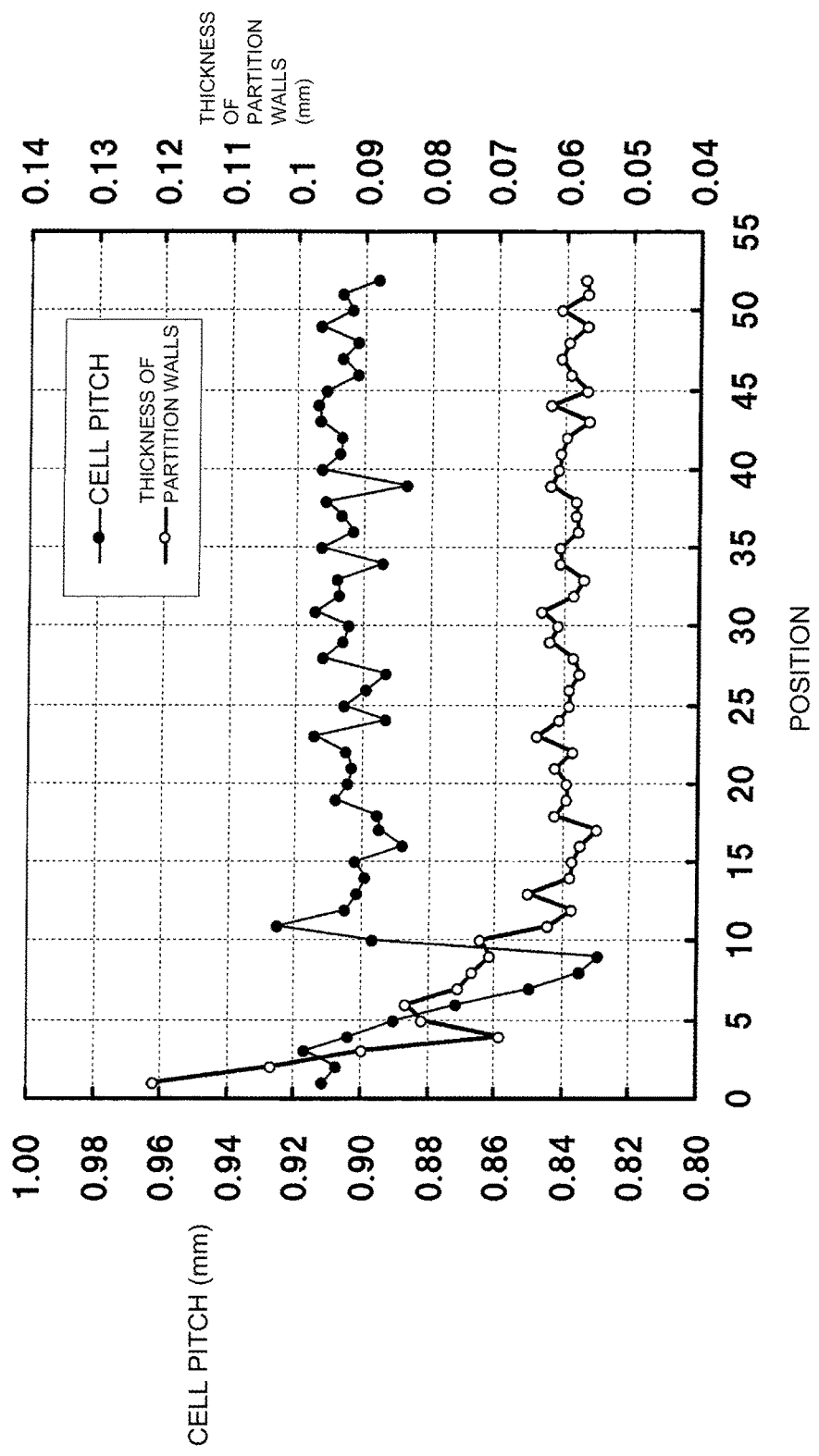
FIG. 18 is a graph showing a relation between cell pitch (mm) of cells arranged on a first line segment and thickness (mm) of partition walls in a honeycomb structure of Example 1.
Figure 19:
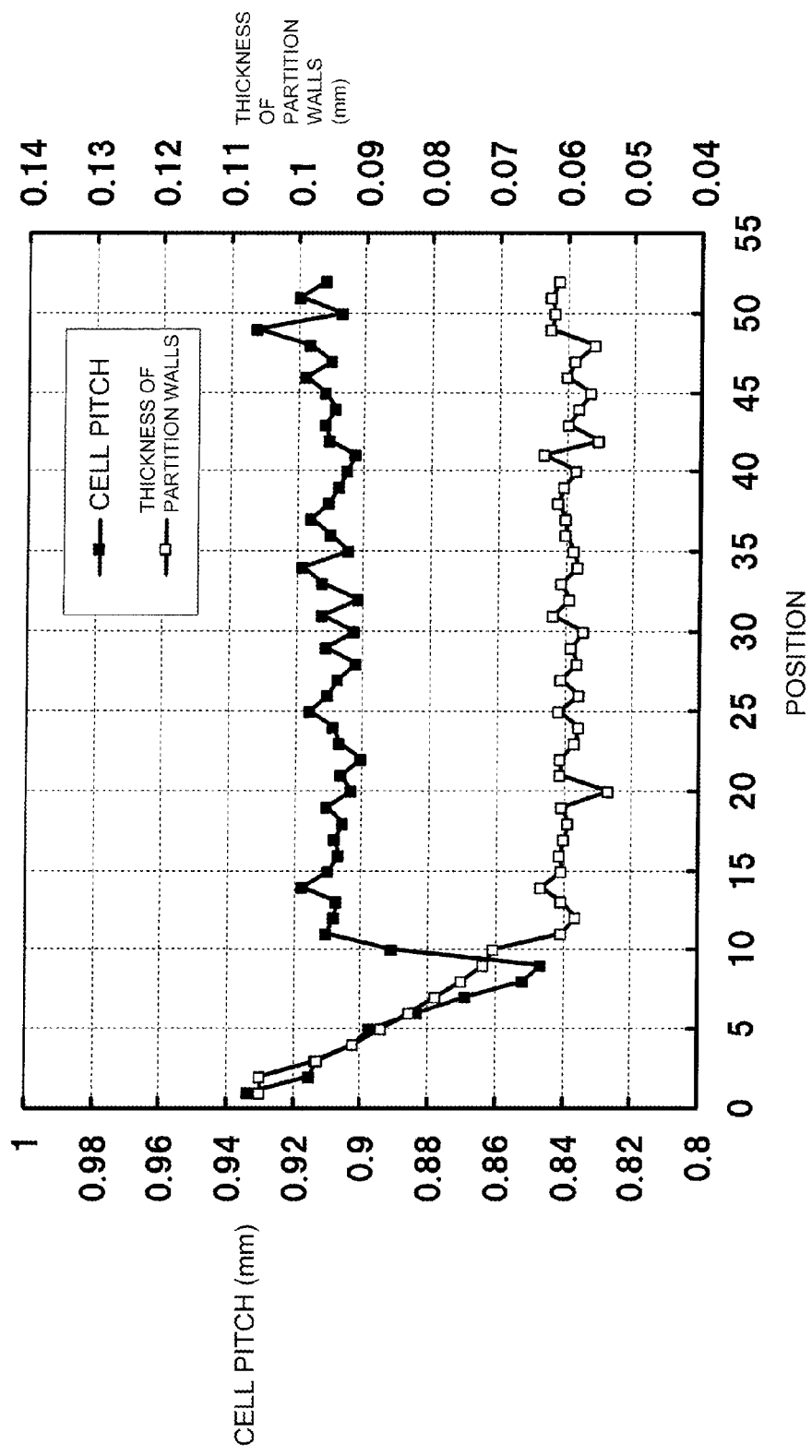
FIG. 19 is a graph showing a relation between cell pitch (mm) of cells arranged on a second line segment and thickness (mm) of partition walls in the honeycomb structure of Example 1.
Figure 20:
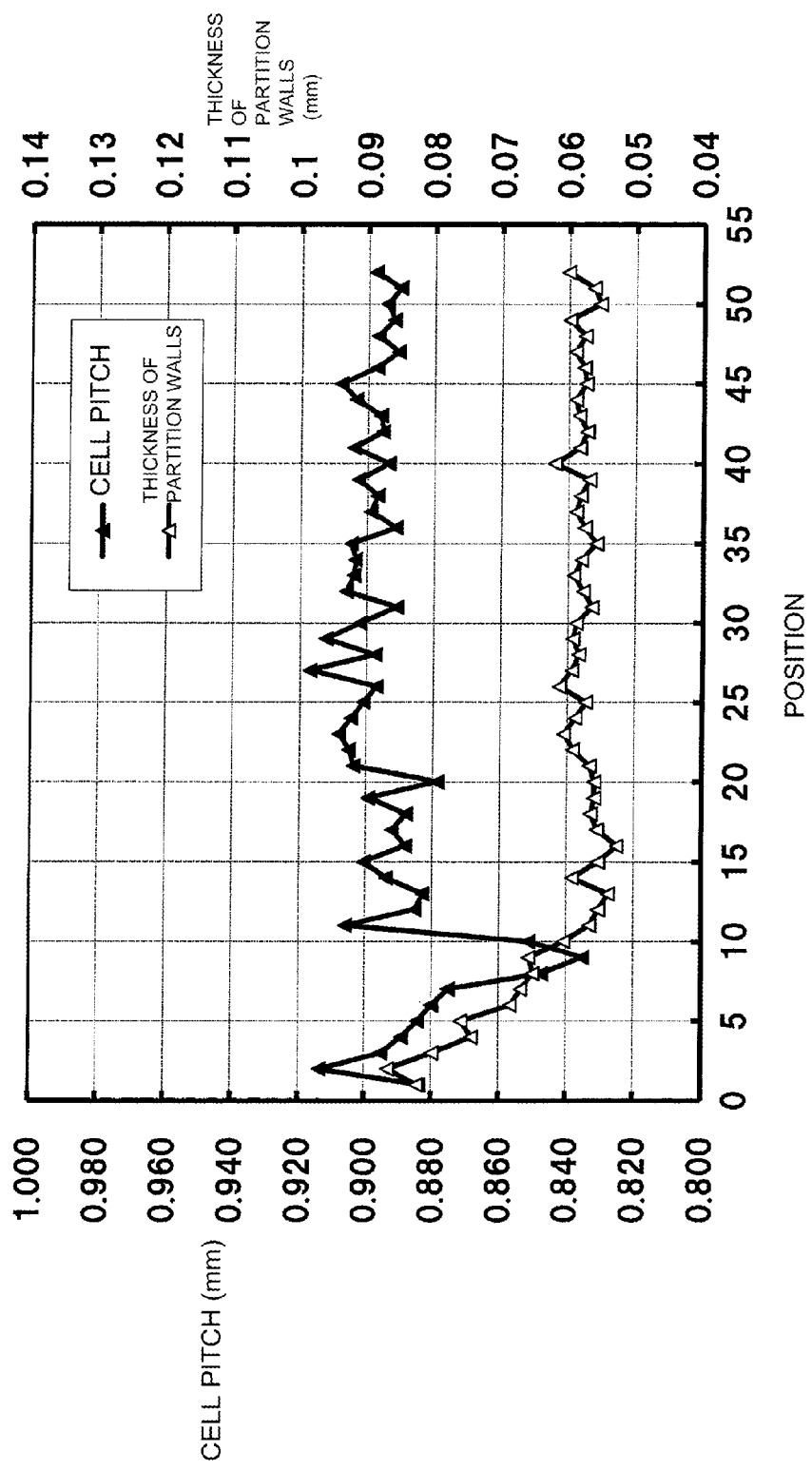
FIG. 20 is a graph showing a relation between cell pitch (mm) of cells arranged on a third line segment and thickness (mm) of partition walls in the honeycomb structure of Example 1.

For the honeycomb structure of Example 1, in the cross section of this honeycomb structure, the number of the cells arranged on the first line segment from the outermost circumference of the cross section to the center of gravity of the cross section was 52. Specifically, the number of the cells arranged from the center of gravity of the cross section in the 0° direction was 52. Here, it is considered that the cell positioned at the outermost circumference of the above cross section of the honeycomb structure of Example 1 is the first cell, and the cell positioned at the center of gravity of the cross section is the fifty-second cell. FIG. 18 is a graph showing a relation between cell pitch (mm) of the cells arranged on the first line segment and thickness (mm) of the partition walls in the honeycomb structure of Example 1. Furthermore, in the honeycomb structure of Example 1, the number of the cells arranged on each of the second line segment and the third line segment from the outermost circumference of the above cross section to the center of gravity of the cross section was 52. FIG. 19 is a graph showing a relation between cell pitch (mm) of the cells arranged on the second line segment (i.e., the cells arranged in the 60° direction) and thickness (mm) of the partition walls in the honeycomb structure of Example 1. FIG. 20 is a graph showing a relation between cell pitch (mm) of the cells arranged on the third line segment (i.e., the cells arranged in the 120° direction) and thickness (mm) of the partition walls in the honeycomb structure of Example 1. In the graphs shown in FIG. 18 to FIG. 20, the abscissa indicates the positions of the cells in a case where the cell positioned in the outermost circumference of the cross section is the first cell and the cell positioned at the center of gravity of the cross section is the fifty-second cell. In the graphs shown in FIG. 18 to FIG. 20, the right ordinate indicates the thickness (mm) of the partition walls, and the left ordinate indicates the cell pitch (mm).

TABLE 1

| | Thickness of partition walls of central region (μm) | Thickness of partition walls of circumferential region (μm) | Cell density (cells/cm$^2$) | Sectional shape of cells | Dia. of end face (mm) | Length (mm) | Small cell-pitch cells Presence/absence | Arrangement direction of small cell-pitch cells |
|---|---|---|---|---|---|---|---|---|
| Example 1 | 63.5 | 90 | 139.5 | Hexagonal | 93 | 118 | Present | 0°, 60°, 120° direction |
| Example 2 | 63.5 | 95 | 139.5 | Hexagonal | 93 | 118 | Present | 0° direction |
| Example 3 | 63.5 | 85 | 139.5 | Hexagonal | 93 | 118 | Present | 0° direction |
| Example 4 | 63.5 | 100 | 139.5 | Quadrangular | 105.7 | 130 | Present | 0° direction |
| Example 5 | 63.5 | 100 | 139.5 | Quadrangular | 105.7 | 130 | Present | 0° direction |
| Example 6 | 63.5 | 83 | 139.5 | Quadrangular | 105.7 | 130 | Present | 0° direction |
| Example 7 | 88.9 | 120 | 93 | Hexagonal | 110 | 100 | Present | 0° direction |
| Example 8 | 88.9 | 110 | 93 | Hexagonal | 110 | 100 | Present | 0° direction |
| Example 9 | 88.9 | 130 | 93 | Hexagonal | 110 | 100 | Present | 0° direction |
| Example 10 | 88.9 | 105 | 93 | Quadrangular | 105.7 | 90 | Present | 0° direction |
| Example 11 | 88.9 | 140 | 93 | Quadrangular | 105.7 | 90 | Present | 0° direction |
| Example 12 | 63.5 | 95 | 139.5 | Hexagonal | 93 | 118 | Present | 0°, 60° direction |
| Example 13 | 63.5 | 90 | 139.5 | Hexagonal | 93 | 118 | Present | 0° direction |
| Example 14 | 63.5 | 100 | 139.5 | Quadrangular | 105.7 | 130 | Present | 0°, 90° direction |
| Example 15 | 63.5 | 95 | 139.5 | Hexagonal | 254 | 254 | Present | 0° direction |
| Example 16 | 63.5 | 93 | 139.5 | Quadrangular | 381 | 305 | Present | 0° direction |
| Example 17 | 115.0 | 140 | 62 | Hexagonal | 381 | 381 | Present | 0° direction |
| Example 18 | 115.0 | 145 | 62 | Quadrangular | 304.8 | 254 | Present | 0° direction |
| Comparative Example 1 | 63.5 | 90 | 139.5 | Hexagonal | 93 | 118 | None | — |
| Comparative Example 2 | 63.5 | 95 | 139.5 | Hexagonal | 93 | 118 | Present | 0° direction |
| Comparative Example 3 | 63.5 | 85 | 139.5 | Hexagonal | 93 | 118 | Present | 0° direction |
| Comparative Example 4 | 63.5 | 100 | 139.5 | Quadrangular | 105.7 | 130 | None | — |
| Comparative Example 5 | 63.5 | 88 | 139.5 | Quadrangular | 105.7 | 130 | Present | 0° direction |
| Comparative Example 6 | 88.9 | 120 | 93 | Hexagonal | 110 | 100 | None | — |
| Comparative Example 7 | 88.9 | 110 | 93 | Hexagonal | 110 | 100 | Present | 0° direction |
| Comparative Example 8 | 88.9 | 130 | 93 | Quadrangular | 105.7 | 90 | None | — |
| Comparative Example 9 | 88.9 | 105 | 93 | Quadrangular | 105.7 | 90 | Present | 0° direction |
| Comparative Example 10 | 63.5 | 95 | 139.5 | Hexagonal | 254 | 254 | Present | 0° direction |

TABLE 1-continued

| | Thickness of partition walls of central region (μm) | Thickness of partition walls of circumferential region (μm) | Cell density (cells/cm²) | Sectional shape of cells | Dia. of end face (mm) | Length (mm) | Small cell-pitch cells Presence/absence | Arrangement direction of small cell-pitch cells |
|---|---|---|---|---|---|---|---|---|
| Comparative Example 11 | 63.5 | 94 | 139.5 | Quadrangular | 381 | 305 | None | — |
| Comparative Example 12 | 115.0 | 143 | 62 | Hexagonal | 381 | 381 | None | — |
| Comparative Example 13 | 115.0 | 140 | 62 | Quadrangular | 304.8 | 254 | Present | 0° direction |

TABLE 2

| | Number of cells of circumferential region (cells) | Cell pitch of central region cells (mm) | Forming range of small cell-pitch cells (cell number from outermost circumference) | Cell pitch (minimum value) of small cell-pitch cells (mm) | Ratio of cell pitch (%) |
|---|---|---|---|---|---|
| Example 1 | 10 | 0.90 | 5~10 | 0.83 | 0.92 |
| Example 2 | 8 | 0.90 | 5~11 | 0.80 | 0.89 |
| Example 3 | 13 | 0.91 | 8~14 | 0.85 | 0.93 |
| Example 4 | 7 | 0.85 | 5~10 | 0.80 | 0.94 |
| Example 5 | 10 | 0.85 | 5~11 | 0.77 | 0.91 |
| Example 6 | 9 | 0.85 | 4~13 | 0.78 | 0.92 |
| Example 7 | 10 | 1.11 | 5~15 | 1.05 | 0.95 |
| Example 8 | 5 | 1.11 | 2~9 | 1.00 | 0.90 |
| Example 9 | 13 | 1.11 | 10~16 | 1.02 | 0.92 |
| Example 10 | 10 | 1.04 | 6~14 | 0.98 | 0.94 |
| Example 11 | 8 | 1.04 | 5~12 | 0.94 | 0.90 |
| Example 12 | 10 | 0.91 | 5~15 | 0.84 | 0.92 |
| Example 13 | 10 | 0.89 | 7~11 | 0.84 | 0.94 |
| Example 14 | 7 | 0.85 | 5~10 | 0.80 | 0.94 |
| Example 15 | 10 | 0.90 | 5~15 | 0.83 | 0.92 |
| Example 16 | 13 | 0.85 | 8~14 | 0.78 | 0.92 |
| Example 17 | 8 | 1.36 | 5~11 | 1.22 | 0.90 |
| Example 18 | 10 | 1.27 | 5~15 | 1.14 | 0.90 |
| Comparative Example 1 | 10 | 0.91 | — | 0.91 | — |
| Comparative Example 2 | 10 | 0.90 | 10~15 | 0.88 | 0.98 |
| Comparative Example 3 | 10 | 0.91 | 20~30 | 0.84 | 0.92 |
| Comparative Example 4 | 10 | 0.85 | — | 0.85 | — |
| Comparative Example 5 | 10 | 0.85 | 5~12 | 0.83 | 0.98 |
| Comparative Example 6 | 5 | 1.11 | — | 1.11 | — |
| Comparative Example 7 | 5 | 1.11 | 20~30 | 1.02 | 0.92 |
| Comparative Example 8 | 8 | 1.04 | — | 1.04 | — |
| Comparative Example 9 | 8 | 1.04 | 6~14 | 1.02 | 0.98 |
| Comparative Example 10 | 10 | 0.89 | 5~15 | 0.87 | 0.98 |
| Comparative Example 11 | 13 | 0.85 | — | 0.85 | 1.00 |
| Comparative Example 12 | 8 | 1.36 | — | 1.36 | 1.00 |
| Comparative Example 13 | 10 | 1.27 | 6~14 | 1.25 | 0.98 |

TABLE 3

| | Evaluation of thermal shock resistance (1) | Evaluation of thermal shock resistance (2) |
|---|---|---|
| Example 1 | OK | OK |
| Example 2 | OK | OK |
| Example 3 | OK | OK |
| Example 4 | OK | OK |
| Example 5 | OK | OK |
| Example 6 | OK | OK |
| Example 7 | OK | OK |
| Example 8 | OK | OK |
| Example 9 | OK | OK |
| Example 10 | OK | OK |
| Example 11 | OK | OK |
| Example 12 | OK | OK |
| Example 13 | OK | OK |
| Example 14 | OK | OK |
| Example 15 | OK | OK |
| Example 16 | OK | OK |
| Example 17 | OK | OK |
| Example 18 | OK | OK |
| Comparative Example 1 | OK | NG |
| Comparative Example 2 | OK | NG |
| Comparative Example 3 | NG | NG |
| Comparative Example 4 | OK | NG |
| Comparative Example 5 | OK | NG |
| Comparative Example 6 | OK | NG |
| Comparative Example 7 | NG | NG |
| Comparative Example 8 | OK | NG |
| Comparative Example 9 | OK | NG |
| Comparative Example 10 | NG | NG |
| Comparative Example 11 | NG | NG |
| Comparative Example 12 | NG | NG |
| Comparative Example 13 | OK | NG |

Examples 2 to 18 and Comparative Examples 1 to 13

The same procedures of Example 1 were repeated except that partition wall thickness, cell density, cell sectional shape, end face diameter, length, circumferential region forming range, central region forming range and small cell-pitch cell forming range were changed as shown in Table 1 and Table 2, to prepare the respective honeycomb structures. For the obtained respective honeycomb structures, "evaluation of thermal shock resistance (1)" and "evaluation of thermal shock resistance (2)" were performed by a method similar to Example 1. The results are shown in Table 3.

In the honeycomb structures of Examples 4 to 6, 10, 11, 14, 16, 18 and Comparative Examples 4, 5, 8, 9, 11 and 13, the sectional shape of the cells was quadrangular. When the sectional shape of the cells was quadrangular, the arrangement direction of the small cell-pitch cells was specified as follows. One line segment passing a center of gravity in a cross section perpendicular to a cell extending direction of the honeycomb structure and extending in a direction perpendicular to the partition walls each constituting one side of each quadrangular cell is to be a first line segment, and an extending direction of the first line segment is to be a "0° direction". Furthermore, a line segment obtained by rotating and moving the above one line segment as much as 90° in a clockwise direction based on the center of gravity of the cross section is to be a fourth line segment, and an extending direction of the fourth line segment is to be a "90° direction".

Figure 21:
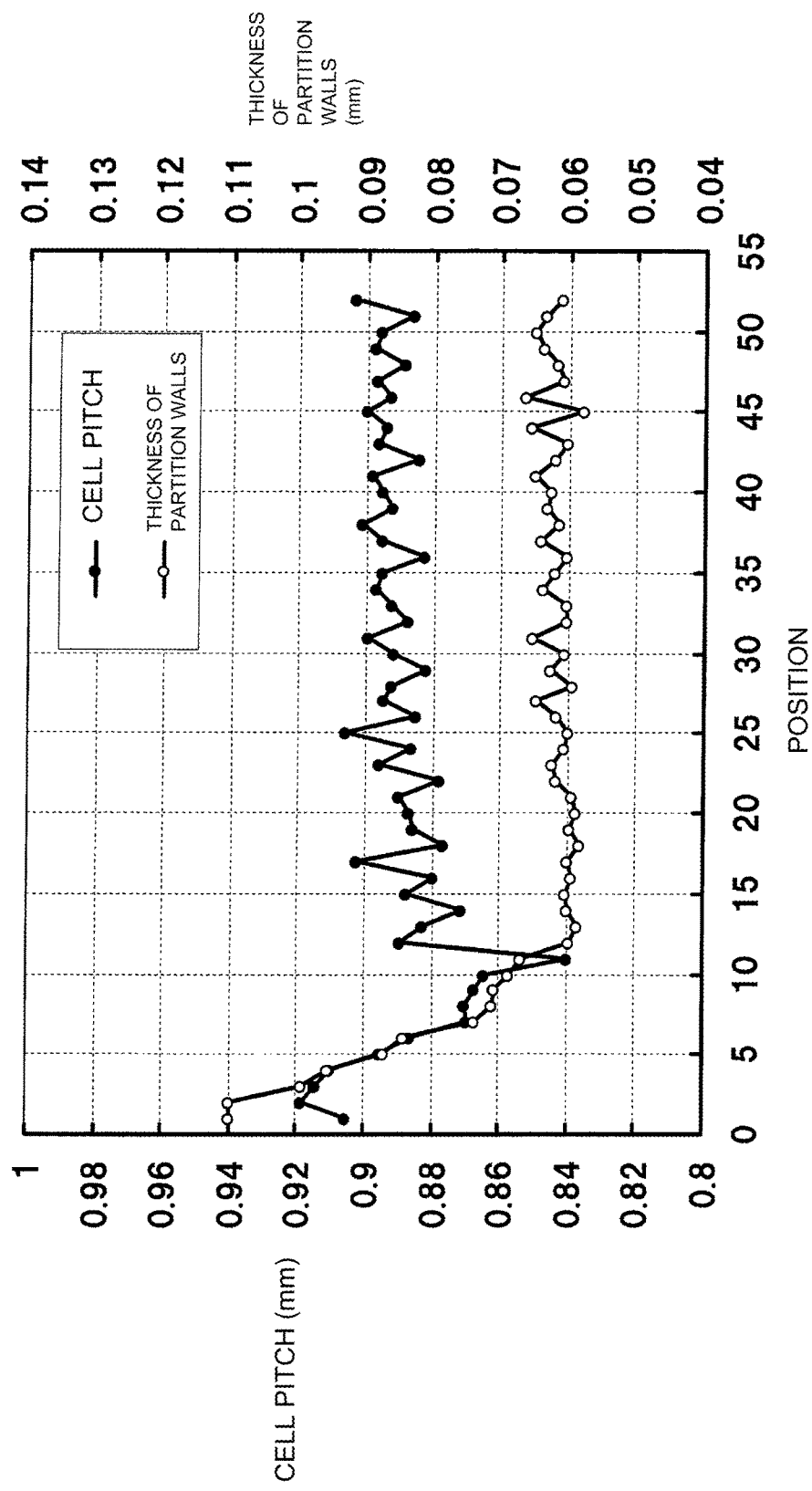
FIG. 21 is a graph showing a relation between cell pitch (mm) of cells arranged on a first line segment and thickness (mm) of partition walls in a honeycomb structure of Example 13.

Here, FIG. 21 shows another example indicating a relation between cell pitch (mm) of cells arranged on a first line segment and thickness (mm) of partition walls. FIG. 21 is a graph showing the relation between the cell pitch (mm) of the cells arranged on the first line segment (i.e., the cells arranged in a 0° direction) and the thickness of the partition walls in a honeycomb structure of Example 13. In the graph shown in FIG. 21, the abscissa indicates positions of the cells in a case where the cell positioned at the outermost circumference of the cross section is the first cell and the cell positioned at the center of gravity of the cross section is the fifty-second cell. In the graph shown in FIG. 21, the right ordinate indicates the thickness (mm) of the partition walls, and the left ordinate indicates the cell pitch (mm).

(Results)

For the honeycomb structures of Examples 1 to 18, in the evaluation of the thermal shock resistance (1) and the evaluation of the thermal shock resistance (2), no crack was confirmed in the boundary portion, and it has been found that the honeycomb structures are excellent in thermal shock resistance. On the other hand, when the small cell-pitch cells were not present as in Comparative Example 1, the cracks were confirmed in the boundary portion in the evaluation of the thermal shock resistance (2). Furthermore, when the small cell-pitch cells were formed so as to deviate from the boundary between the central region and the circumferential region as in Comparative Example 3, the cracks were confirmed in the boundary portion in the evaluation of the thermal shock resistance (1) and the evaluation of the thermal shock resistance (2). Furthermore, for Comparative Example 2 in which the ratio of the cell pitch was 98%, in the evaluation of the thermal shock resistance (2), the cracks were confirmed in the boundary portion, and it has been found that the thermal shock resistance of the boundary portion between the central region and the circumferential region has not sufficiently improved.

A honeycomb structure of the present invention can be utilized in purification of an exhaust gas. For example, the honeycomb structure of the present invention is usable in a catalyst carrier or a filter.

DESCRIPTION OF REFERENCE NUMERALS

1, 31: partition wall, 2, 32: cell, 2a, 32a: cell (central region cell), 2b, 32b: cell (circumferential region cell), 2c, 32c: cell (small cell-pitch cell), 3, 33: circumferential wall, 10, 10A, 40: honeycomb structure body, 11, 41: first end face, 12, 42: second end face, 21, 51: circumferential region, 22, 52: central region, 23, 53: boundary portion, 24, 54: boundary (the boundary between the central region and the circumferential region), 29a, 59a: first line segment, 29b: another line segment (the second line segment), 29c: another line segment (the third line segment), 100, 100A, 200: honeycomb structure, L1, L2, L3, L4, L5, L6, L7, L8 and L9: cell pitch, and O: center of gravity.

What is claimed is:

1. A honeycomb structure comprising:
   a tubular honeycomb structure body having porous partition walls to define a plurality of cells extending from a first end face to a second end face,
   wherein in a cross section perpendicular to an extending direction of the cells of the honeycomb structure body, the partition walls are disposed so that a shape of the cells is polygonal, and
   the honeycomb structure body is constituted so that a thickness of the partition walls in a circumferential region positioned on an outer side of a central region is larger than a thickness of the partition walls in the central region including a center of gravity of the cross section, and
   in the cross section of the honeycomb structure body, when one line segment passing the center of gravity of the cross section and extending in a direction perpendicular to the partition walls each constituting one side of each of the polygonal cells is to be a first line segment, for respective one to five cells each arranged on the first line segment toward each of the central region side and the circumferential region side from a boundary between the central region and the circumferential region among the cells arranged on the first line segment, a cell pitch in an extending direction of the first line segment has a size of 70% or more and 95% or less to a cell pitch in the extending direction of the first line segment of the cells arranged on the first line segment in the central region excluding the respective one to five cells.

2. The honeycomb structure according to claim 1,
   wherein in the cross section of the honeycomb structure body, when another line segment passing the center of gravity of the cross section and extending in a direction perpendicular to the partition walls constituting sides other than the one side of each of the polygonal cells is to be a second line segment, for respective one to five cells each arranged on the second line segment toward each of the central region side and the circumferential region side from the boundary between the central region and the circumferential region among the cells arranged on the second line segment, a cell pitch in the extending direction of the second line segment has a size of 70% or more and 95% or less to a cell pitch in the extending direction of the second line segment of the cells arranged on the second line segment in the central region excluding the respective one to five cells.

3. The honeycomb structure according to claim 2,
   wherein in the cells arranged on the first line segment, a shape of the respective one to five cells each arranged on the first line segment toward each of the central region side and the circumferential region side from the boundary between the central region and the circumferential region is a shape obtained by contracting a shape of the cells formed in the central region excluding the respective one to five cells, along the extending direction of the first line segment.

4. The honeycomb structure according to claim 3,
   wherein in the cells arranged on the first line segment, a thickness of the partition walls in the circumferential region excluding the respective one to five cells arranged in the extending direction of the first line segment is from 1.05 to 1.8 times a thickness of the partition walls in the central region excluding the respective one to five cells arranged in the extending direction of the first line segment.

5. The honeycomb structure according to claim 4, wherein in the cells arranged on the first line segment, a cell pitch of the cells formed in the central region excluding the respective one to five cells arranged in the extending direction of the first line segment has the same cell pitch as that of the cells formed in the circumferential region excluding the respective one to five cells arranged in the extending direction of the first line segment.

6. The honeycomb structure according to claim 3, wherein in the cells arranged on the first line segment, a cell pitch of the cells formed in the central region excluding the respective one to five cells arranged in the extending direction of the first line segment has the same cell pitch as that of the cells formed in the circumferential region excluding the respective one to five cells arranged in the extending direction of the first line segment.

7. The honeycomb structure according to claim 2, wherein in the cells arranged on the first line segment, a thickness of the partition walls in the circumferential region excluding the respective one to five cells arranged in the extending direction of the first line segment is from 1.05 to 1.8 times a thickness of the partition walls in the central region excluding the respective one to five cells arranged in the extending direction of the first line segment.

8. The honeycomb structure according to claim 7, wherein in the cells arranged on the first line segment, a cell pitch of the cells formed in the central region excluding the respective one to five cells arranged in the extending direction of the first line segment has the same cell pitch as that of the cells formed in the circumferential region excluding the respective one to five cells arranged in the extending direction of the first line segment.

9. The honeycomb structure according to claim 2, wherein in the cells arranged on the first line segment, a cell pitch of the cells formed in the central region excluding the respective one to five cells arranged in the extending direction of the first line segment has the same cell pitch as that of the cells formed in the circumferential region excluding the respective one to five cells arranged in the extending direction of the first line segment.

10. The honeycomb structure according to claim 1, wherein in the cells arranged on the first line segment, a shape of the respective one to five cells each arranged on the first line segment toward each of the central region side and the circumferential region side from the boundary between the central region and the circumferential region is a shape obtained by contracting a shape of the cells formed in the central region excluding the respective one to five cells, along the extending direction of the first line segment.

11. The honeycomb structure according to claim 10, wherein in the cells arranged on the first line segment, a thickness of the partition walls in the circumferential region excluding the respective one to five cells arranged in the extending direction of the first line segment is from 1.05 to 1.8 times a thickness of the partition walls in the central region excluding the respective one to five cells arranged in the extending direction of the first line segment.

12. The honeycomb structure according to claim 11, wherein in the cells arranged on the first line segment, a cell pitch of the cells formed in the central region excluding the respective one to five cells arranged in the extending direction of the first line segment has the same cell pitch as that of the cells formed in the circumferential region excluding the respective one to five cells arranged in the extending direction of the first line segment.

13. The honeycomb structure according to claim 10, wherein in the cells arranged on the first line segment, a cell pitch of the cells formed in the central region excluding the respective one to five cells arranged in the extending direction of the first line segment has the same cell pitch as that of the cells formed in the circumferential region excluding the respective one to five cells arranged in the extending direction of the first line segment.

14. The honeycomb structure according to claim 1, wherein in the cells arranged on the first line segment, a thickness of the partition walls in the circumferential region excluding the respective one to five cells arranged in the extending direction of the first line segment is from 1.05 to 1.8 times a thickness of the partition walls in the central region excluding the respective one to five cells arranged in the extending direction of the first line segment.

15. The honeycomb structure according to claim 14, wherein in the cells arranged on the first line segment, a cell pitch of the cells formed in the central region excluding the respective one to five cells arranged in the extending direction of the first line segment has the same cell pitch as that of the cells formed in the circumferential region excluding the respective one to five cells arranged in the extending direction of the first line segment.

16. The honeycomb structure according to claim 1, wherein in the cells arranged on the first line segment, a cell pitch of the cells formed in the central region excluding the respective one to five cells arranged in the extending direction of the first line segment has the same cell pitch as that of the cells formed in the circumferential region excluding the respective one to five cells arranged in the extending direction of the first line segment.

* * * * *